United States Patent
Baker et al.

(10) Patent No.: US 12,083,519 B2
(45) Date of Patent: Sep. 10, 2024

(54) SAMPLE CONTAINER WITH INTEGRATED INTERNAL REFLECTION ELEMENT

(71) Applicant: DXCOVER LIMITED, Glasgow (GB)

(72) Inventors: Matthew Baker, Crainlarich (GB);
Mark Hegarty, East Kilbride (GB);
Holly Jean Butler, Glasgow (GB)

(73) Assignee: DXCOVER LIMITED, Glasgow (GB)

( * ) Notice: Subject to any disclaimer, the term of this patent is extended or adjusted under 35 U.S.C. 154(b) by 559 days.

(21) Appl. No.: 17/284,386

(22) PCT Filed: Oct. 11, 2019

(86) PCT No.: PCT/GB2019/052898
§ 371 (c)(1),
(2) Date: Apr. 9, 2021

(87) PCT Pub. No.: WO2020/074918
PCT Pub. Date: Apr. 16, 2020

(65) Prior Publication Data
US 2021/0339245 A1  Nov. 4, 2021

(30) Foreign Application Priority Data

Oct. 12, 2018 (GB) ..................................... 1816687

(51) Int. Cl.
*B01L 3/00* (2006.01)
*G01N 21/03* (2006.01)
(Continued)

(52) U.S. Cl.
CPC ...... *B01L 3/50825* (2013.01); *G01N 21/0303* (2013.01); *G01N 21/3577* (2013.01);
(Continued)

(58) Field of Classification Search
CPC ........... B01L 3/50825; B01L 2300/046; B01L 2300/0832; B01L 2300/0654;
(Continued)

(56) References Cited

U.S. PATENT DOCUMENTS

| | | | |
|---|---|---|---|
| 4,451,434 A | 5/1984 | Hart | 356/246 |
| 5,172,182 A * | 12/1992 | Sting | G01N 21/552 356/244 |

(Continued)

FOREIGN PATENT DOCUMENTS

| | | |
|---|---|---|
| DE | 102007019230 | 11/2007 |
| EP | 3129460 | 2/2017 |

(Continued)

OTHER PUBLICATIONS

Hands, J. R. et al. (2014) "Attenuated Total Reflection Fourier Transform Infrared (ATR-FTIR) spectral discrimination of brain tumour severity from serum samples," Journal of Biophotonics 7(3-4), 189-199.

(Continued)

*Primary Examiner* — Tarifur R Chowdhury
*Assistant Examiner* — Carlos Perez-Guzman
(74) *Attorney, Agent, or Firm* — Medlen & Carroll, LLP

(57) ABSTRACT

A sample container (100) for use in a ATR-FTIR spectrometer, comprises an internal reflection element "IRE" (101), the IRE comprising a first surface (104) and a second surface (105). The first surface (104) is configured to receive a sample (20) and the second surface (105) is an infrared beam-receiving surface. The IRE (101) forms at least a portion of a wall of the sample container (100), such that in use, when a sample (20) is provided on the first surface (104) of the IRE (101), the sample (20) is provided within the sample container (100).

19 Claims, 19 Drawing Sheets

(51) Int. Cl.
  *G01N 21/35* (2014.01)
  *G01N 21/3577* (2014.01)
  *G01N 21/552* (2014.01)
(52) U.S. Cl.
  CPC ...... *G01N 21/552* (2013.01); *B01L 2300/046* (2013.01); *B01L 2300/0832* (2013.01); *G01N 2021/3595* (2013.01); *G01N 2201/0636* (2013.01)
(58) Field of Classification Search
  CPC ........ B01L 2300/0681; G01N 21/0303; G01N 21/3577; G01N 21/552; G01N 2021/3595; G01N 2201/0636
  See application file for complete search history.

(56) References Cited

U.S. PATENT DOCUMENTS

| | | | | |
|---|---|---|---|---|
| 5,460,973 | A * | 10/1995 | Schrader | G01N 21/552 422/82.11 |
| 5,616,922 | A * | 4/1997 | Reffner | G01N 21/552 250/341.8 |
| 5,965,889 | A * | 10/1999 | Brierley | G01J 3/45 250/341.8 |
| 6,007,778 | A * | 12/1999 | Cholewa | B01L 3/5082 422/534 |
| 6,130,745 | A * | 10/2000 | Manian | G02B 21/241 356/123 |
| 6,929,943 | B1 | 8/2005 | Quapil et al. | 435/287.1 |
| 2003/0087423 | A1 * | 5/2003 | Haywood | B01L 3/502 435/270 |
| 2003/0157725 | A1 | 8/2003 | Franzen et al. | 436/171 |
| 2004/0258563 | A1 * | 12/2004 | Young | C12Q 1/6806 422/400 |
| 2006/0087654 | A1 | 4/2006 | Wolf et al. | 356/436 |
| 2010/0084558 | A1 | 4/2010 | Wang et al. | 250/339.11 |
| 2015/0064080 | A1 | 3/2015 | Skakoon | 422/419 |
| 2017/0029761 | A1 * | 2/2017 | Hoffmann-Petersen | C12M 41/48 |
| 2017/0065971 | A1 * | 3/2017 | Kreifels | B01L 3/5082 |
| 2019/0094114 | A1 * | 3/2019 | Myers, III | B01L 3/5029 |
| 2019/0247849 | A1 * | 8/2019 | Ueyama | G01N 35/02 |
| 2020/0197928 | A1 * | 6/2020 | Letourneau | G01N 33/5302 |

FOREIGN PATENT DOCUMENTS

| | | |
|---|---|---|
| JP | H07294421 | 11/1995 |
| JP | H08145879 | 6/1996 |
| KR | 20100086671 | 8/2010 |
| WO | WO/2001/014859 | 3/2001 |
| WO | WO/2002/077616 | 10/2002 |
| WO | WO/2018/178669 | 10/2018 |
| WO | WO/2018/190358 | 10/2018 |

OTHER PUBLICATIONS

Hands, J. R. et al. (2016) "Brain tumour differentiation: rapid stratified serum diagnostics via attenuated total reflection Fourier-transform infrared spectroscopy," Journal of Neurooncology 127(3), 463-472.

Moore, J. C. et al. (2012) "Development and Application of a Database of Food Ingredient Fraud and Economically Motivated Adulteration from 1980 to 2010," *Journal of Food Science* 77(4), R118-R126.

PCT International Search Report of International Application No. PCT/US2019/049759 dated Feb. 7, 2020.

United Kingdom Search Report for Application No. GB1816687.6 dated Apr. 16, 2019.

* cited by examiner

SAMPLE CONTAINER WITH INTEGRATED INTERNAL REFLECTION ELEMENT

The present invention relates to devices and methods for performing Infrared spectroscopy analysis, and in particular, though not exclusively, for performing ATR-FTIR spectroscopic analysis.

BACKGROUND TO THE INVENTION

Fourier Transform Infrared (FTIR) spectroscopy is a technique commonly used in chemical, biological and materials sciences in order to identify the characteristic vibrations of chemical bonds present in a sample. This technique relies on the fact that different chemical bonds (such as C—O vs. C=C) vibrate at different frequencies and that the bonds absorb light at corresponding frequencies to their characteristic vibration i.e. mid-infrared (MIR) light approximately 4000-400 $cm^{-1}$.

Therefore, if a sample is irradiated across the MIR region the different bonds absorb light relative to the presence of the types of chemical bonds present in the sample. As the relative quantities of the types of chemical bonds are distinctive to particular molecules, FTIR can be used to characterise and quantify complex biological molecules in a sample.

One of the key challenges of FTIR sampling of biological samples is that the samples contain both the target molecule(s) and non-target MIR-absorbent molecules. Typically, the non-target molecules will be at a higher concentration than the target molecule(s), such as where the non-target molecules include a sample's solvent, for example water. Therefore, techniques should be used which maximise the clarity of the signal from the target molecule(s).

There are three main sampling methods in FTIR spectroscopy; transmission, transflection and attenuated total-reflection (ATR).

Transmission mode is where MIR is passed through a sample and absorbance is subsequently measured. As the light is transmitted through the sample, this technique is reliant on the thickness of the sample (if too much absorbance occurs, no meaningful absorbance profile may be measured) and the non-target MIR-absorbent molecules (e.g. water) content therein. With standard globar sources, the thickness of a sample is limited to approximately 6 micron when considering the Amide vibration.

Transflection mode is where the MIR is passed through the sample once, reflected and passed through a second time before being measured. As this passes through the sample twice, this is again reliant on sample thickness and non-target MIR-absorbent molecules (e.g. water) content.

Additionally, the interaction of the light with the reflective surface may affect the absorbance profile of the sample.

Finally, in ATR mode, an internal reflective element (IRE) is employed: the sample is placed in close proximity to the IRE and the MIR light is passed through the IRE, through the sample and into a detector. The angles used when passing the light through the IRE are specific to the refractive index of the material used to form the IRE. Typical materials used to create IREs include diamond, germanium, zinc selenide or silicon.

When the light passes through the IRE above an angle defined by the material used to create the IRE (the critical angle), the light is then internally reflected in the IRE towards the detector. However, when the light meets the IRE-sample interface an evanescent wave is formed which penetrates and is absorbed by the sample. The absorbance of the evanescent wave may be measured by the detector.

The depth of penetration by the evanescent wave is determined by the wavelength of the light, the refractive index of the material used to form the IRE and the angle of attack of the light on the IRE. Typically sample penetration is approximately 0.5-2 μm.

As such ATR-FTIR spectroscopy is well suited to analysing samples which contain non-target MIR-absorbent molecules (e.g. water), due to the path length/depth of penetration being independent of sample thickness, such as samples which contain biological materials, particularly biofluids such as blood, blood serum or cerebrospinal fluid. Biofluids are particularly information-rich, therefore the sensitivity of ATR-FTIR spectroscopy is particularly well-suited. The technique has been shown to be suitable to detect diseases: it has been shown that this technique is capable of diagnosing brain tumours at a range of severities using blood serum (Hands et al., 2016; Hands et al. 2014). In addition, ATR-FTIR is well suited for samples containing biological macromolecules such as the products of DNA amplification steps or protein purification steps.

Advantageously analysis of samples may be performed on internal reflection elements (IRE) which are configured to allow a sample to be easily provided on a sample receiving surface of the IRE and such that a beam receiving surface of an IRE can be arranged in a spectrometer for analysis of the sample. In addition to biological samples, such samples may also generally be in the form of aqueous and non-aqueous liquids such as, but not limited to, oils, emulsions, gels, glues, solutions; and also solid samples, such as powders, crystals and polymers.

SUMMARY OF THE INVENTION

The inventors have developed a sample container comprising an internal reflection element (IRE) which allows for the collection of a sample and the provision of the sample onto an IRE without further handling of the sample and a method of providing a sample in a sample container such that the sample can be located onto an IRE such that analysis of the sample can be undertaken.

Suitably, conventional sample containers may be used to which a modified cap is provided wherein the cap comprises an internal reflection element mounting portion, the internal reflection element mounting portion being capable of receiving an IRE such that in use when an IRE is provided on the mounting portion, sample can be provided to a first sample receiving surface of the IRE and a second opposite surface of the IRE is a beam receiving surface which can be appropriately located in a spectrophotometer.

Accordingly, a first aspect of the invention provides a cap for a sample container, the cap comprising a mount for an internal reflection element and, optionally an internal reflection element located in the mount wherein the internal reflection element provides a sample receiving surface and a beam receiving surface.

Suitably, the cap comprising the internal reflection element mount may comprise an aperture extending from a first surface to a second opposite surface of the cap wherein the internal reflection element mount is a recess in the first surface of the cap capable of receiving an IRE such that the beam receiving surface of the IRE is provided at the first surface of the cap and in use sample can be provided to a first sample receiving surface.

Suitably, a cap may be selected from a cap or stopper capable of sealing an Eppendorf™ tube, a cryotube, a PCR tube, an auto-sampler tube, a spectroscopic cuvette or the like.

Suitably, a cap may have a flange or lip of the second surface of the cap, the flange or lip surrounding the aperture wherein the flange or lip can retain sample in proximity to the sample receiving surface of the IRE when the IRE is located in the IRE mount of the cap.

Suitably, the flange or lip of the cap may locate the cap on a sample container and optionally can provide for sealing of the container with the cap. Suitably, the flange or lip of the cap may, in use, form a fiction fit with the container. Suitably, the flange or lip of the cap may, in use, form a screw attachment with the container, for example, the container may be threaded to receive a screw thread of a corresponding flange or lip on a cap. For example, a container may have a female thread and the flange or the lip may be male threaded.

Suitably, the internal reflection element may, when located in the IRE mount, be fixed in position with adhesive.

Suitably, the internal reflection element may be integrated into an IRE mount using insert moulding or cast moulding.

Suitably, the IRE may be a silicon IRE. Suitably, a cap of the first aspect may be provided as a string or array a caps, the caps linked to each other by a frangible portion, for example a plastic spacer between each cap.

In embodiments, an IRE located in an IRE mount may provide the beam receiving surface in the same plane as the first surface of the cap.

In alternative embodiments, an IRE located in an IRE mount may provide the beam receiving surface above or below the plane of the first surface of the cap.

Suitably, the cap may comprise a selectively permeable membrane located at the first (sample receiving) side of the IRE wherein in use, the membrane is interposed between the IRE and sample.

Suitably there may be provided sample-receiving element comprising an internal reflective element (IRE) wherein the sample-receiving element is configured to provide at least a portion of a wall of a sample container (for example can form a cap);
  wherein the IRE comprises a first surface and a second surface;
  wherein the first surface is configured to contact or receive a sample and wherein the second surface is a beam-receiving surface, and
  wherein, in use, the first surface of the IRE is provided on an internal wall of the sample container (for example underside of a cap), such that when a sample is provided on the first surface of the IRE, the sample is locatable within the sample container (for example the underside of a cap being in communication with the internal cavity of the sample container or at least a portion thereof).

According to a second aspect of the invention there is provided a combination of first portion of a sample container and a second portion of a sample container wherein the first portion of the sample container comprises a sample-receiving element and is configured to interact with a second portion of the sample container to provide at least a portion of a wall of a sample container, the sample receiving element comprising an internal reflective element (IRE),
  wherein the IRE comprises a first surface and a second surface;
  wherein the first surface is configured to contact or receive a sample and wherein the second surface is a beam-receiving surface, and
  wherein, in use, the first surface of the IRE is provided on an internal wall of the sample container, such that when a sample is provided on the first surface of the IRE, the sample is locatable within the sample container.

Suitably, a cap of the first aspect of the invention may provide a sample receiving element.

Advantageously, the sample-receiving element may be used in combination with a second portion of the sample container to house a sample for spectroscopic analysis. The sample may be collected in the sample container in one location and transported to the spectrometer at a second location. As the sample in the sample container is already in proximity with or can be brought into contact with the first surface of the IRE with removing the sample from the container, this is particularly suited to sensitive samples, such as samples which are affected by handling, temperature or air. The container may be suitable to contain liquids (aqueous and non-aqueous), for example oils, emulsions, gels, glues, and solutions for analysis by FTIR-ATR. The container may be suitable to hold powders, crystals or polymers for analysis by FTIR-ATR. The container may be suitable to hold swabs for scene of crime collection of samples.

Advantageously, the IRE of the sample-receiving element may be intended for single-use.

In embodiments the sample-receiving element is adapted to connect with the second portion of the sample container by means of a friction fit or screw thread.

In embodiments the sample-receiving element is connected to the second portion of the sample container by a hinge. Suitably the IRE is provided in the sealing cap or the base of a vial or tube container or capsule container to collect and store samples for FTIR-ATR analysis.

In embodiments the sample-receiving element is adapted to act as a lid, cap or plug to the sample container. Suitably the sample-receiving element is provided in a lid or cap of a tube or a vial, such as an Eppendorf™ tube, PCR tube, cryotube or spectroscopic cuvette, such that a portion of the external face of the lid forms a detector face (second surface or side of IRE) and an internal face of the lid forms a sample receiving surface (first surface or side of the IRE). Suitably a sample may be provided in the container (for example an Eppendorf™ tube) and inversion of the tube provides the sample on the first surface of the IRE and such that when the container is located in a spectrometer a beam can be provided to the second surface of IRE for spectrometer analysis.

In embodiments the sample-receiving element can further comprise a membrane, e.g. a selectively-permeable membrane, provided or juxtaposed between the first surface of the IRE and a portion of the sample container, such that when a sample is provided to the portion of the sample container, one or more target molecule(s) in the sample may selectively permeate through the membrane to be provided on the first surface of the IRE.

Suitably IRE caps and sample containers, for example vials can be used for liquid analysis of clinical specimens, such as blood components like serum. This can be used for diagnostic, qualitative or quantitative measurements. Blood serum may suitably be measured in liquid form (as discussed for example in relation to FIG. 15A). The water component of serum can be seen in the resultant spectrum, as well as underlying biological signals from the serum, in particular protein contributions.

According to the third aspect of the invention there is provided a sample container for use in a spectrometer,
- wherein the sample container comprises an IRE, the IRE comprising a first surface and a second surface;
- wherein the first surface is configured to contact or receive a sample and wherein the second surface is a beam-receiving surface; and
- wherein the IRE forms at least a portion of a wall of the sample container, such that in use, when a sample is provided on the first surface of the IRE, the sample is provided within the sample container.

Advantageously, the IRE of the sample-receiving element or sample container may be intended for single-use.

Suitably, the second portion of the sample container of the second aspect or the sample container of the third aspect may comprise a membrane therein, wherein the membrane may be selectively permeable. Suitably the second portion of the sample container or a sample container may comprise membrane interposed between a sample in the second portion of the container or the container and the IRE.

In embodiments the first or second portion of the sample container or a sample container can comprise membrane mounting means to allow a membrane to be interposed between a sample in the second portion of the container or the container and the IRE.

In embodiments the sample container can further comprise a membrane, e.g. a selectively-permeable membrane, provided or juxtaposed between the first surface of the IRE and a portion of the sample container. By such provision, in use, when a sample is provided to the portion of the sample container, one or more target molecule(s) in the sample may selectively migrate or permeate through the membrane to be provided on the first surface of the IRE.

The sample container may comprise a lower or end compartment located near a distal end of the container and/or located at or near an end opposite a/the sample receiving portion, cap and/or IRE. The sample container may comprise an upper or top compartment located near a proximal end of the container, e.g., opposite the lower compartment and/or at or near an end containing or proximal the sample receiving portion, cap and/or IRE. Tus, the terms "lower" and "upper" will not be understood as relating to any particular orientation, but rather as their location relative to the sample receiving portion, cap and/or IRE.

The lower compartment and the upper compartment may be separated or divided by a divider. The divider may extend substantially across a width of the container between a lower end and an upper end or sample receiving portion thereof. The divider may comprise a/the membrane, e.g. a/the selectively permeable membrane.

The membrane may form part of the divider. Alternatively, the membrane may form the entirety of the divider and/or the divider may be defined by the membrane. The divider may extend inwards from an inner side or surface of the sample container. The divider may extend at an angle from an inner side or surface of the sample container, e.g. at an angle in the range of 10-170°, e.g. 20-160°. Conveniently, the divider may extend at an angle from an inner side or surface of the sample container, e.g. at an angle in the range of 90-170°, e.g. 100-160°. By such provision, the divider may define a cup portion, which may be capable of receiving and/or holding a substance at or near a lower end of the upper compartment.

The membrane may be a flexible membrane. The membrane may be a rigid or solid membrane. It will be appreciated that the specific type of membrane selected for use in the divider and/or sample container may be chosen to allow an analyte or a plurality of analytes of interest to migrate or permeate through the membrane, in use, whilst preventing or limiting permeation or migration of other substances through the membrane. For example, the membrane may comprise or may be a PVDF membrane.

In use, the lower compartment may be configured to receive a/the sample. Advantageously, the upper compartment may be configured to receive an acceptor medium, e.g. an acceptor solution, for example in a/the cup portion. By such provision, in use, a/the target analyte or substance may permeate through the membrane from the sample to the acceptor medium.

The container may be made of separate sections. The container may comprise an upper section which may comprise the sample receiving portion, cap and/or IRE. The container may comprise a lower section which may comprise or may define the lower compartment, in use. The divider and/or membrane may form part of the upper section or may form part of the lower section. The upper section and the lower section may be connectable, e.g. sealably connectable, via standard attachment means such as screw fit, push fit, clamp means, adhesive, melt bonding, or the like.

In an embodiment, the upper section may comprise the sample receiving portion, cap and/or IRE, and the divider. In such instance, the upper section may comprise a/the cup portion defined by the divider. The upper section may comprise, e.g. on an outer surface thereof, means for engaging with and/or connecting to the lower section, e.g. threaded grooves. The lower section may comprise at or near an upper end thereof, e.g. on an inner surface thereof, means for engaging with and/or connecting to the upper section, e.g. threaded grooves. By such provision, in use, a sample may be provided within the lower section, and the lower and upper section may subsequently be connected together to provide or define the container.

In another embodiment, the upper section and the lower section may be unitary or one-piece. In such case, the lower section may be provided with an inlet, e.g. an inlet port, configured to allow sample to be fed into and retained within the lower section of the container. The inlet may comprise a one-way valve, a sealable port, or the like.

Typically, the divider may comprise an impermeable portion and a/the membrane region. Typically, the impermeable may be provided in a peripheral region of the divider, e.g. in a region near an/or extending inwards from the inner surface of the container. The membrane may be provided at or near a central region of the divider.

In embodiments of either the first or second aspect of the invention, the second surface of the IRE can be provided with a protective cover, optionally wherein the protective cover comprises a removable adhesive film. Advantageously the protective cover prevents damage to the IRE or the addition of material to the second surface of the IRE such as fingerprints. Suitably the protective cover may be a protective cap which may be located over the IRE.

In embodiments of the first or second or third aspects of the invention, the second surface of the IRE can comprise a plurality of aligned, parallel and/or adjacent grooves and/or prisms preferably a plurality of elongate grooves and/or prisms, e.g., a plurality of aligned, parallel and/or adjacent grooves and/or prisms.

Advantageously, the plurality of aligned, parallel and/or adjacent grooves and/or prisms are configured to permit light from the spectrometer to penetrate the second surface of the IRE at an angle such that the light may be reflected on the internal surface of the first surface of the IRE and be directed out of the IRE towards the detector of the spectrometer.

Each groove may have or may define a first groove face and a second groove face. Either or both of the first or second groove faces may be arranged to allow a light from the spectrometer to pass through the groove face(s).

Each prism may have or may define a first prism face and a second prism face. Either or both of the first or second prism faces may be arranged to allow a radiation beam to pass through the prism face(s).

Typically, the first groove face of a groove may correspond to the first prism face of an adjacent prism. The second groove face of a groove may correspond to the second prism face of an adjacent prism.

In embodiments of the first, second or third aspect of the invention, the prism can protrude outwards (i.e. relative to the surface of the second surface of the IRE). In other embodiments of the first, second or third aspect of the invention, the prisms can be recessed (i.e. relative to the surface of the second surface of the IRE). In yet other embodiments of either the first, second or third aspect of the invention, an outer portion of the prisms can protrude outwardly (i.e. relative to the surface of the second surface of the IRE), and an inner portion of the prisms can be recessed (i.e. relative to the surface of the second surface of the IRE).

In embodiments, the IRE can have a thickness of about 100-1000 µm, about 200-800 µm or about 300-700 µm.

In embodiments, the/each groove or prism can have a width (such as a maximum width) of about 50-500 µm, about 50-300 µm or about 100-250 µm.

In embodiments, the/each groove or prism can have a depth (such as a maximum depth) of about 50-500 µm, about 50-300 or about 70-200 µm.

In embodiments of either the first or second aspect of the invention, adjacent grooves or prisms can have a spacing (such as a maximum spacing) of about 0-200 µm, about 10-150 µm or about 25-100 µm.

In embodiments, the first and/or second face of the/each groove or prism extends at an angle relative to the surface of the second surface of the IRE of about 30-75°, or about 35-55°. It will be appreciated that the exact angle chosen may depend on the material selected for manufacture of the IRE and/or the expected angle of incidence of the light reflecting on the internal surface of the first surface of the IRE and the intended wavelength of light used. For instance, where the IRE is manufactured from silicon, the first and/or second face of the/each groove or prism may extend at an angle relative to the surface of the second surface of the IRE of about 40-75°, about 45-65° about 55°, or about 54.74°. Alternatively, where the IRE is manufactured from silicon, the first and/or second face of the/each groove or prism may extend at an angle relative to the surface of the second surface of the IRE of about 30-50°, about 30-40°, about 35°, about 35.3°.

In embodiments, the IRE can be formed of material suitable for use as an IRE: e.g. germanium, diamond, zinc selenide, or silicon. Advantageously, the IRE may be made of silicon. The use of silicon may considerably reduce the costs associated with the manufacture of the IRE, and may allow the cap, sample receiving portion or container to be used once then discarded.

In embodiments the second surface of the IRE can comprise a plurality of aligned, parallel and/or adjacent grooves and/or prisms.

In embodiments the IRE can have a thickness of about 300-700 µm.

In embodiments each groove of the second surface of the IRE can have a width of about 50-500 µm.

In embodiments the spacing between adjacent grooves of the second surface of the IRE is about 0-200 µm.

In embodiments the IRE can be made out of (formed of) silicon.

Suitably, a plurality of containers of the second or third aspect of the present invention may be provided together for processing by a spectrometer, for example multiple containers may be webbed together in an array, for example as two containers, four containers, eight containers, twelve containers or the like.

Suitably, containers as described herein could be utilised for analysis of liquids, such as biofluids or oils. For example, oil samples can be placed in a container at source (in the field) and analysed at source or sent to a lab for later analysis.

Suitably, different samples could be rapidly analysed on the same instrument with no cleaning and no risk of cross contamination as the container could simply be inverted to allow the light beam of the spectrometer to contact the IRE and act on the sample provided thereon and the container would not need to be opened. In particular, the containers as described herein may be particularly suitable for corrosive/harmful chemicals or sensitive biological samples to allow analysis via FTIR-ATR as sealed units. Advantageously, this may be used with hazardous or volatile materials without further dispensing or exposure. This is particularly suitable for samples which may harm the user.

Further, containers as described herein may allow improved quality control or identification of samples for analysis by ATR-FTIR Suitably, sensitive samples may be dispensed into the container of the present invention in an inert atmosphere and analysed by ATR-FTIR with no exposure to the environment.

Suitably a container may be provided with more than one IRE provided on at least one wall of the container, for example an IRE may be provided at one end or at both ends of a container. Suitably a container with multiple IREs, provided at a first and second positions on a container, for example a first and second wall or end of a container, may be useful in studying phase separation of liquids (possibly after centrifugation, membrane dialysis, filtration, coagulation, clotting or other treatment). Suitably a container with more than one IRE may have a semi-permeable membrane juxtaposed between a portion of the sample container and at least one IRE, or juxtaposed between two IREs, such that when a sample is provided in the portion of the sample container, one or more target molecule(s) in the sample may selectively permeate through the membrane to be provided on the first surface of the at least one IRE.

Suitably a container of the present invention may be sized such that when a powder or solid sample is provided within the container such that the container is filled with the sample, a cap, for example a compression cap, may be pushed on and locked or screwed to compress the sample for analysis. This may bring the sample into contact with the sample receiving surface of the IRE.

According to a fourth aspect of the invention there is provided the use of a cap, sample-receiving element or sample container of the first, second or third aspect to provide a sample for spectroscopic analysis using an Attenuated Total Reflection Fourier-Transform Infrared (ATR-FTIR) spectrometer.

According to a fifth aspect of the invention there is provided a method of analysing, measuring or detecting a sample by spectroscopy when provided according to the fourth aspect.

According to a sixth aspect of the invention there is provided an adaptor for an ATR-FTIR spectrometer, the adaptor being provided with a sample-receiving element of the first or second aspect or the sample container of the third aspect holding means to hold the sample relative to an ATR-FTIR spectrometer to permit the use of the fourth aspect.

Suitably the holding means may be a clamp, or a shaped receiving portion. Suitably the adaptor comprises a sample receiving element, or sample container receiving portion shaped to correspond to an outside surface of a receiving portion or container, wherein the adapter is fixable to a spectrophotometer to locate a sample receiving element or sample container to an ATR-FTIR spectrometer in the correct position and orientation to allow analysis of sample provided in the sample receiving element or sample container.

Suitably the adaptor may be removably fixed to the spectrophotometer via magnets or by screws or pins.

Suitably the IRE may be located over an aperture allowing the incidence of infrared light on the IRE, by providing a stepped recess into which a cap or sample receiving element of the present invention may be located.

Suitably the adaptor may be located over an aperture allowing the incidence of infrared light on the IRE, by providing a plate over the aperture wherein the plate comprises a second aperture of the correct shape to provide a friction fit to cap or sample receiving element of the present invention, such that the cap or sample receiving element is oriented to provide the IRE in the correct position and orientation to permit the fourth aspect of the invention. Suitably the holding means may further comprise a clamp or shaped receiving portion, to clamp or restrict a cap or sample receiving element when located in the second aperture.

Suitably, the diamond IRE of a standard ATR unit may be replaced with an open aperture (i.e. no diamond IRE inserted). In a method to analyse a sample using a cap, or container or the present invention suitably a locating "adapter" may be used to couple the sample-receiving element or container of the first, second or third aspect of the invention to an ATR-FTIR spectrometer in the correct position and orientation to permit the use of the fourth aspect.

In embodiments, the sample can be analysed, measured or detected using an Attenuated Total Reflection Fourier-Transform Infrared (ATR-FTIR) spectrometer.

In embodiments, the method can use ATR-FTIR spectroscopic analysis.

In embodiments the method can comprise processing measured data using multivariate analysis. Suitably the method may comprise processing measured data using principle component analysis. Suitably the method may comprise guiding a radiation beam generated by the spectrometer to a sample-measuring location of the device, for example a portion on the IRE. Suitably the method may comprise guiding the radiation beam reflected by the IRE. Suitably, a spectrometer for use in the present invention may be an IR spectrometer, e.g. a FTIR spectrometer, typically an ATR-FTIR spectrometer, e.g. an FTIR spectrometer equipped with or coupled to an ATR element.

Suitably the methods discussed herein may use Fourier transform IR (FTIR) spectroscopic analysis. In FTIR, the IR spectra may be collected in the region of 4000-400 wavenumbers ($cm^{-1}$). Generally the IR spectra may have a resolution of 10 $cm^{-1}$ or less, typically approximately 8 $cm^{-1}$ or 4 $cm^{-1}$. Dependent on the application the FTIR spectroscopic analysis may employ a single scan or multiple scans such as 10 scans, at least 15, or at least 30 scans. The FTIR spectroscopic analysis may employ a single scan or at most 100 scans, at most 50 scans, or at most 40 scans. For example, a single scan may used. For example 32 scans may be used and the scans may be co-added. As will be appreciated by the skilled person, the number of scans may be selected to optimize data content and data-acquisition time.

The method may use Attenuated Total Reflection (ATR)-IR spectroscopic analysis. In embodiments, the spectroscopic analysis may be ATR-FTIR. The method may comprise placing one or more samples on the sample slide.

The method may comprise placing a sample onto a cap or sample-receiving element and optionally then providing a second portion of the sample container or providing sample into a sample container and then providing the sample therein onto an internal face of the container provided with the IRE. The sample may comprise a biological sample e.g. a biofluid such as blood or blood serum. Typically, when providing a sample to either the first or second aspects of the invention, the sample may be in liquid form. A sample may comprise a non-biological sample. A sample may be in the form of aqueous and non-aqueous liquid, or a solid sample.

Definitions

The term "analyse" or "analysis" will be understood to include measurement, detection, processing, or the like. Thus, the term "analyse" will also be understood to be referring to the measurement or detection of a sample by FTIR spectrometry, and may also optionally include, but not necessarily, further processing of the measured information, for example using multivariate analysis, processing algorithms, machine learning, and/or Principal Component Analysis (PCA). For example, the use of PCA allows variables between datasets to be compared, visualised and/or highlighted, thus identifying possible variations, e.g. biological variations, between samples.

BRIEF DESCRIPTION OF DRAWINGS

Embodiments of the present invention will now be described by way of example only with reference to the accompanying figures in which:

FIG. 1.

FIG. 7: FIG. 7A shows an exploded view of the adaptor, and FIG. 7B shows the sample locator located in the adaptor such that sample present in the sample container is brought into contact with the sample receiving surface of the IRE.

FIG. 9A shows unprocessed spectra from whole milk and FIG. 9B and FIG. 9C show subsequent analysis.

FIG. 14.

DETAILED DESCRIPTION

It is considered that provision of an IRE as part of a container, for example as part of a vial or stopper cap would provide for an alternative to expensive fixed crystal IREs which are typically used in conventional FTIR-ATR analysis. Containers of the present invention are considered to be advantageous as it is considered they allow for easier collection, handling and analysis of samples.

As will be appreciated, the provision of an IRE as part of a container could be integrated into tubes and vials as currently utilised in sample collection, sample processing, sample storage and in spectroscopy.

Figure 1A:
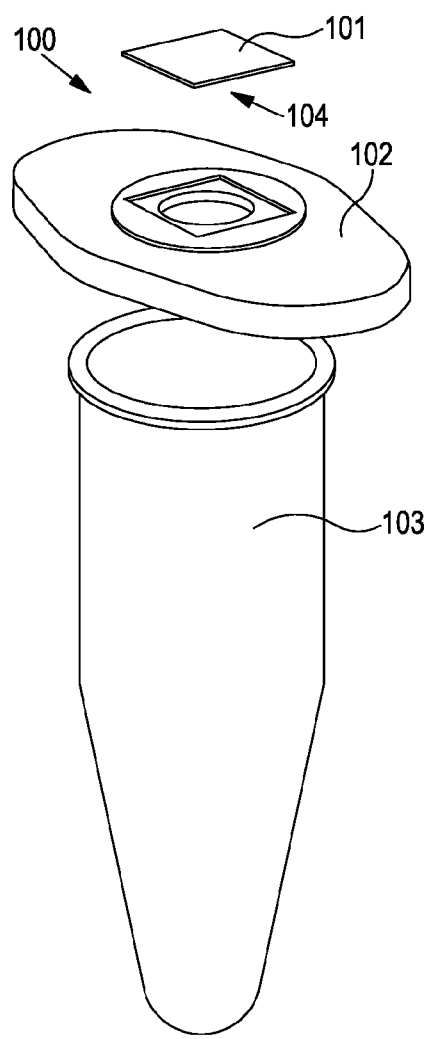
FIGS. 1A, 1B and 1C show an embodiment of the invention where a sample receiving element (the first surface of an IRE) is integrated in a cap (a portion of the wall) of an Eppendorf tube in an IRE mounting portion provided by a recess in a surface of the cap over an aperture with the second surface of the IRE (a second beam receiving surface) providing the external surface of the tube cap and the first sample receiving surface providing a portion of an internal wall of the tube, the sample receiving surface being surrounded by the flange.
Figure 1B:
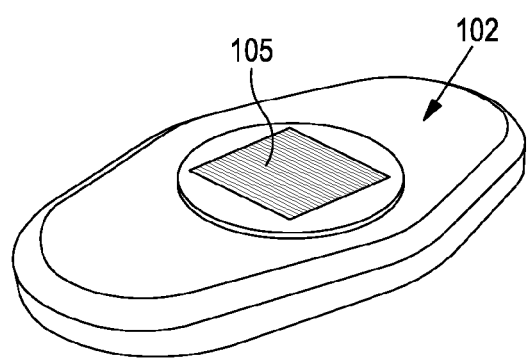
Figure 1C:
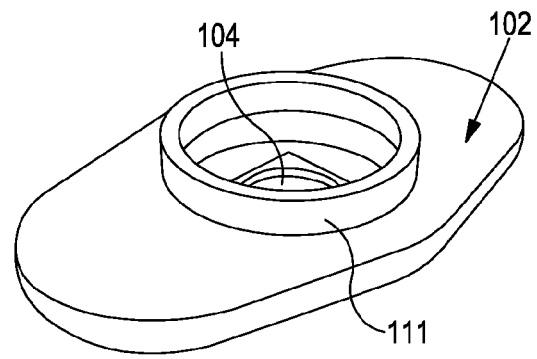

FIGS. 1A, B and C, show a container 100 according to an embodiment of the present invention. FIG. 1A shows the various elements of the container 100, whilst FIGS. 1B and 1C show an outer portion and an inner portion, respectively, of the lid or cap 102. In the container 100, an internal reflective element (IRE) 101 was integrated into the lid 102 of the container 103 such that when the lid 102 (sample-receiving element comprising the IRE 101) was brought together with the rest of the container 103, the lid 102 formed a portion of the wall of the container and the first side 104 of the IRE 101 formed a portion of an internal wall of the container 100, such that it is configured to receive a sample. In use, when a sample is provided on the first side of the IRE, the sample is locatable within the sample container 103. The second side 105 of the IRE 101 is a beam-receiving side and is external to the container 100.

In this embodiment, the cap 102 has a flange 111 configured to interact with and provide a sealing arrangement with the container 130, e.g. by interference fit.

Figure 2:
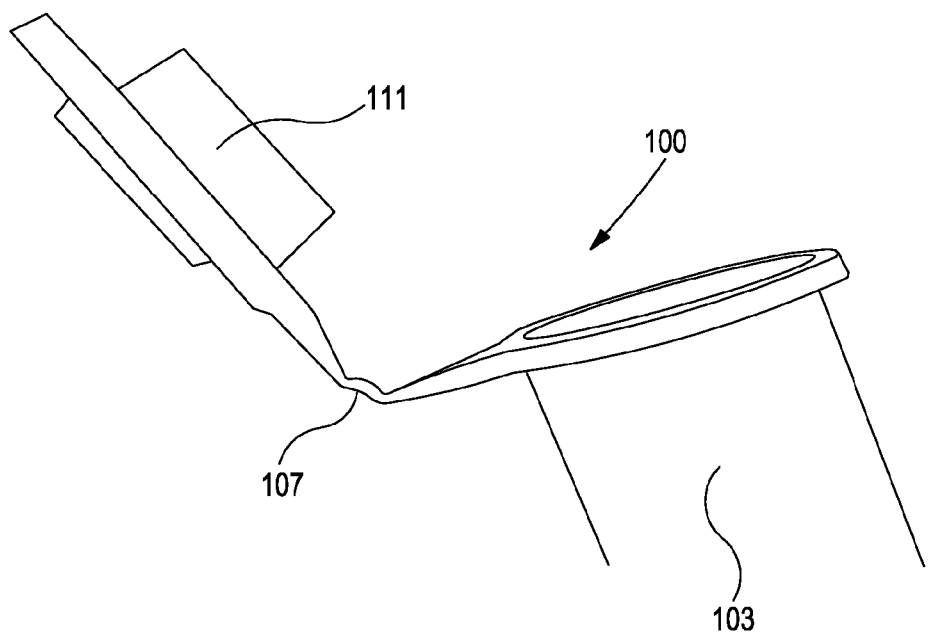
FIG. 2: Shows an embodiment of the present invention where the sample-receiving element (cap) is connected to the sample container by a hinge.

The cap or lid 102 can be provided attached to a container 103 and an embodiment in this regard wherein the sample-receiving element is connected to the sample container by a hinged portion 107 is illustrated in FIG. 2. Advantageously this can be used to simplify usage of the present invention, and/or prevent the lid 102, or specifically the second side of the IRE from being damaged.

Figure 3:
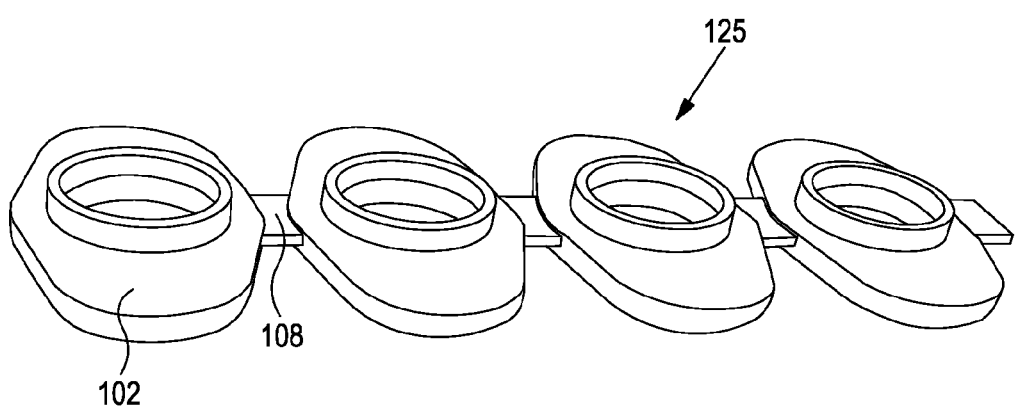
FIG. 3: Shows an embodiment of the present invention where several sample-receiving elements are joined together by frangible or breakable portions to form an array of sample-receiving elements.

Alternatively, several caps or several sample-receiving elements may be provided wherein these are linked together by frangible or breakable portions 108 to form an array 125 of caps 102. The caps 102 (as illustrated in FIG. 3) may then be removed and attached to a container 103 as necessary. Advantageously, these frangible or breakable portions 108 permit the user to break the array 125 into smaller array(s) as needed.

Figure 4:
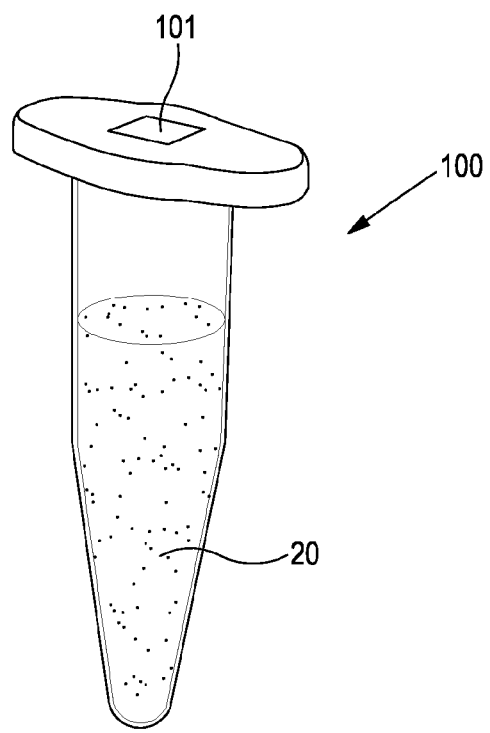
FIG. 4: Shows the use of the container comprising the IRE to gather a liquid sample.

As shown in FIG. 4, in operation a liquid sample 20 was provided into a container 100 according to an embodiment of the present invention. The container 100 may then be inverted to bring the sample into contact with the first side of the IRE 101 provided on the internal wall of the container.

Figure 5:
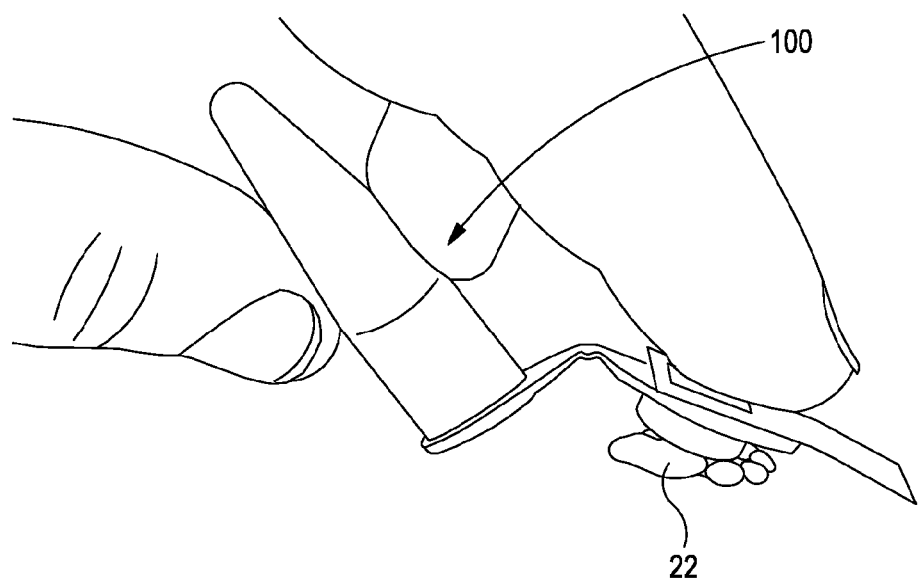
FIG. 5: Shows the use of the container comprising the IRE to gather a solid sample.

Alternatively, as illustrated in FIG. 5 in use, a solid sample 22 may be provided to the sample-receiving element.

Figure 6:
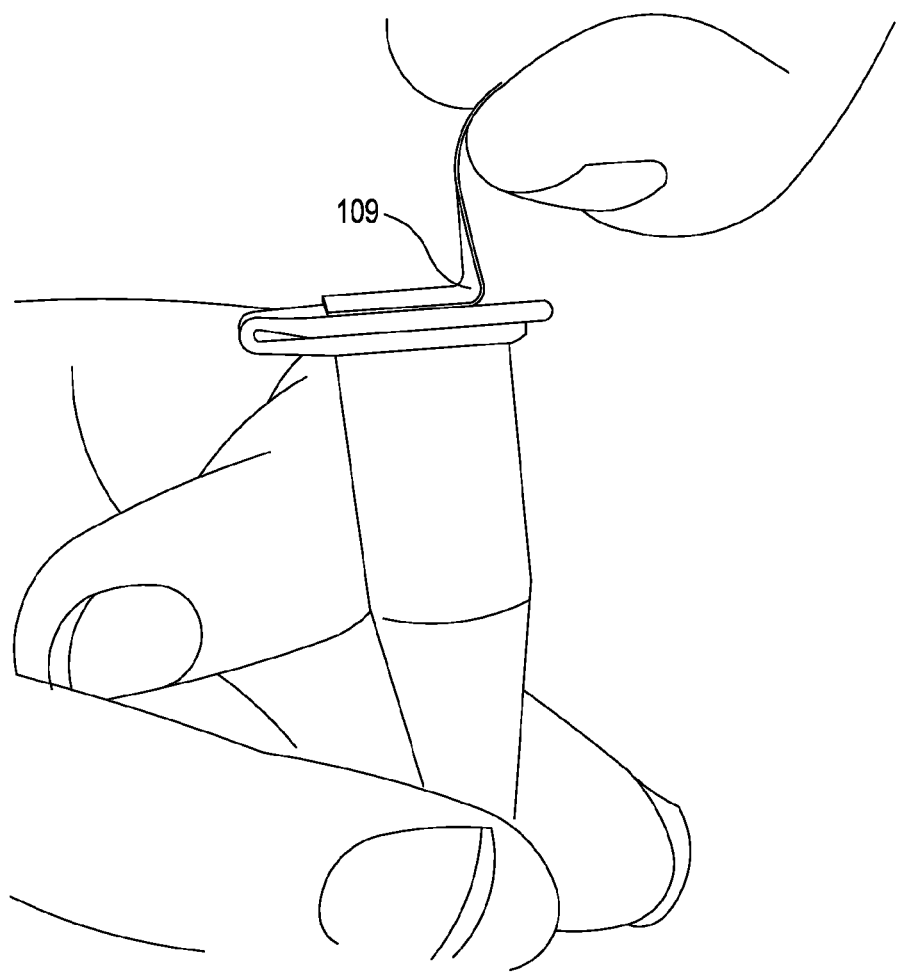
FIG. 6: Shows the removal of a protective film on the second surface of the IRE.

Suitably, as illustrated in FIG. 6 the second side of the IRE can be provided with a protective cover 109: a removable adhesive film to protect the IRE 101 prior to use.

The following examples illustrate the invention without limiting the scope thereof.

FTIR spectroscopy, employing light in the mid-IR range, is a suitable technique for the qualitative and quantitative monitoring of food fraud. An example is provided below of an IR-based system using a sample container as discussed herein for analysis of liquids, emulsions, gels and oils. Advantageously, this can allow rapid and potentially automated attenuated total reflectance (ATR)-FTIR analysis of a range of samples in the food and other industries.

Example 1: Measuring Milk Adulteration

The adulteration of milk is a significant problem that is particularly prevalent in developing and underdeveloped countries, largely due to the absence of monitoring and law enforcement. As shown in Moore et al., Development and Application of a Database of Food Ingredient Fraud and Economically Motivated Adulteration from 1980 to 2010, Journal of Food Science, 2012; 77:R108-16, milk powder is the second most likely food item to be adulterated, after olive oil. Adulterants to milk powder include non-harmful additions such as vegetable protein, whey, water or the milk of other species but also, a number of harmful additions including melamine, hydrogen peroxide, caustic soda, urea and even paint.

Identification of target molecules (e.g. adulterants) in liquids (e.g. milk), was undertaken wherein the cap, sample receiving element of the present invention was used to obtain spectra of adulterated milk in the form of whole, semi-skimmed and skimmed milk.

Figure 8:
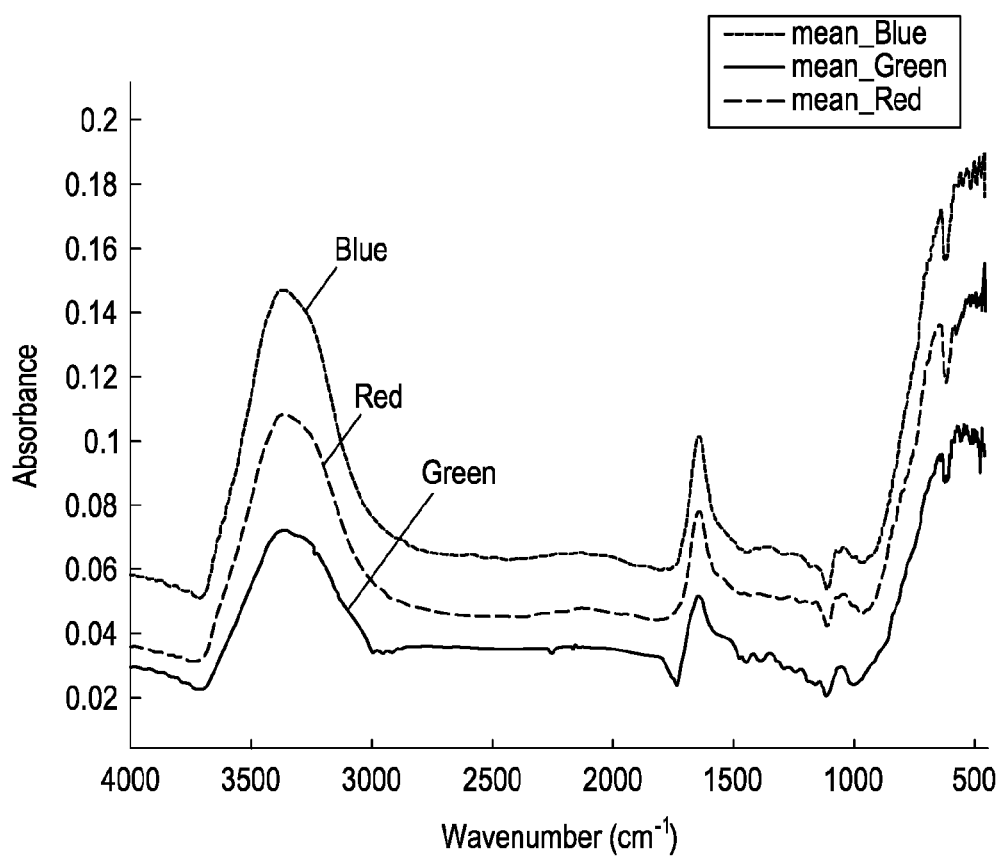
FIG. 8: Shows results of FTIR-ATR analysis of milk being analysed.

FIG. 8 shows the unprocessed spectroscopic absorption profiles from liquids in the form of whole milk (blue), semi-skimmed milk (green), and skimmed milk (red). Each type of milk has fundamentally different compositions due to the removal of fat content from the raw milk product. 3300 cm$^{-1}$ is a major peak as water forms a large component in all types of milk, however some spectral differences can be identified.

Principal component analysis (PCA) was used to compare the spectroscopic variances between whole milk and skimmed milk.

Figure 9:
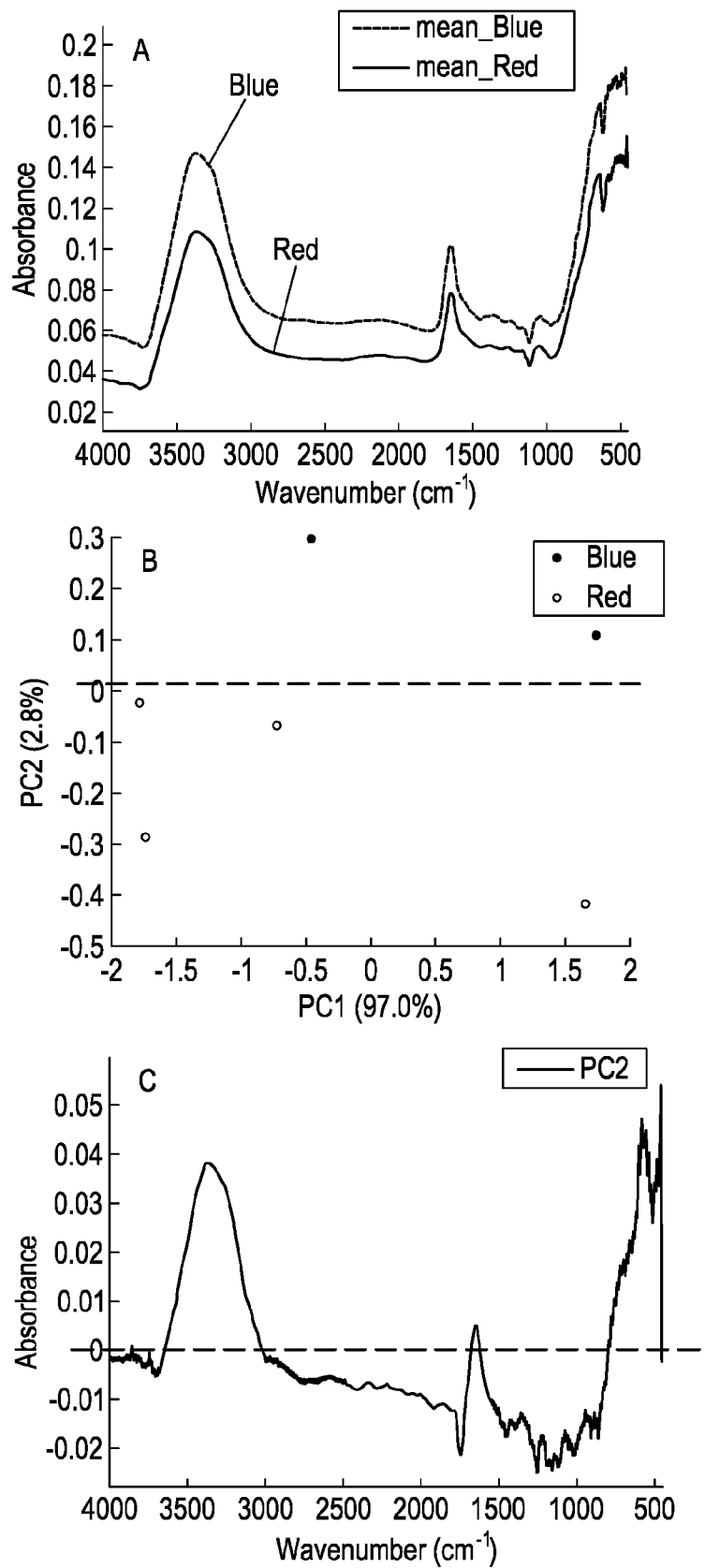
FIG. 9.

FIG. 9A shows unprocessed spectra from whole milk (blue) and skimmed milk (red) samples obtained using the present invention. FIG. 9B shows the subsequent principal component analysis scatter plot of FIG. 9A, and FIG. 9C shows the corresponding principal component 2 loading plot.

Separation in the scatter plot of FIG. 9B represents difference in the spectra, which can be sourced back to exact spectral locations, and thus biological components. This 'loading plot' shows that lipid differences are seen between the two samples, shown at the peak around 1750 cm-1.

This data shows that the ATR-FTIR spectroscopy using a cap/receiving element of the present invention has the potential to pick up fundamental differences in milk samples rapidly and with minimal sample preparation.

Example 2: Whisky

The adulteration of alcohol is another significant issue that can have life-threatening impacts. Whisky adulteration is a good example of this, where additives are commonplace, as well as the fraudulent labelling of inferior products.

Figure 10:
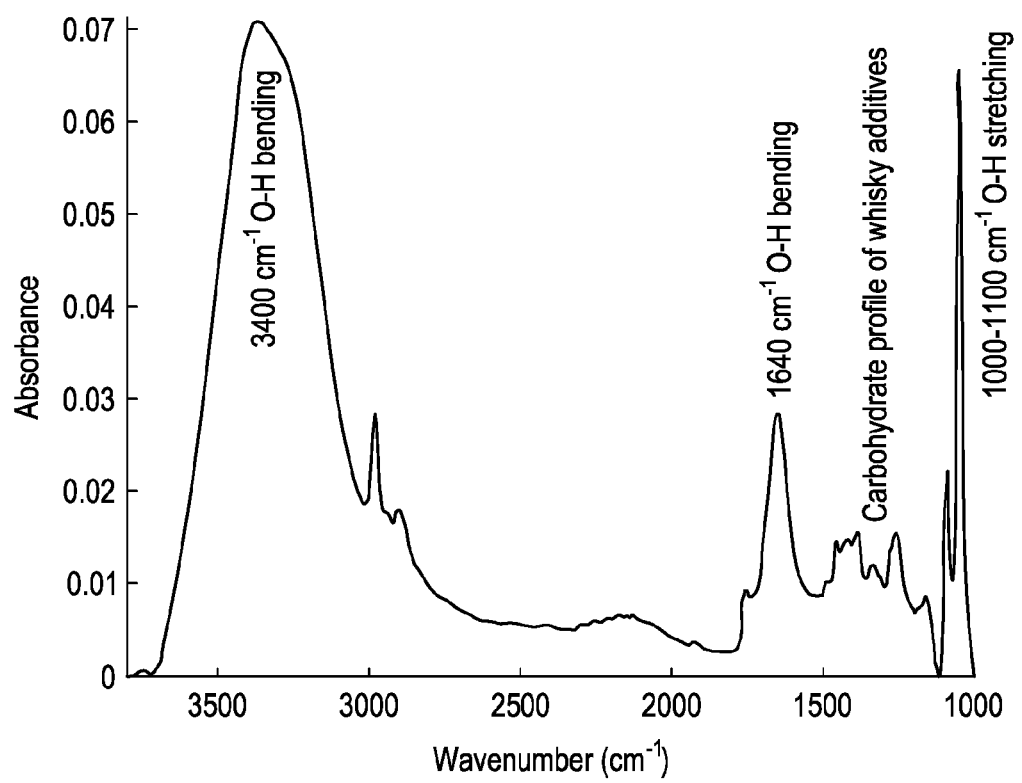
FIG. 10: Shows a spectra obtained from a whisky sample.

As shown in FIG. 10 (a spectra obtained using a sample located on an IRE as part of the present invention, whisky has a strong spectral fingerprint that has clearly identifiable O—H bending and stretching peaks, as well as contributions from key carbohydrate components.

Changes to this spectral signature are easily observed when the composition of the sample is altered.

FIG. 11A demonstrates unprocessed spectra obtained from a sample located on an IRE as part of the present invention. The samples therein are of whisky adulterated with different amounts of water. Small changes can be observed between the raw spectra for each dilution, however these are more apparent in the PCA scatter plot shown in FIG. 11B. Here, each stage of dilution appears to migrate on the negative scale of PC1. The principle component loading plot for PC1 (FIG. 11C) shows that this is due a decrease in absorbance of the O—H stretching peak at 1100 cm-1 upon increasing concentrations of water.

Example 3: Olive Oil Adulteration

As previously mentioned, the adulteration of olive oil is the most common example of food fraud to be found. As little as 10% of olive oil produced meets the standard of extra-virgin oil; however up to 50% is labelled as extra-virgin. Commonly high quality oil is diluted with cheaper oils, including vegetable oils. The ability to detect this dilution using a high-throughput sampling method using the present invention, may allow rapid screening of potentially adulterated oils.

Figure 12:
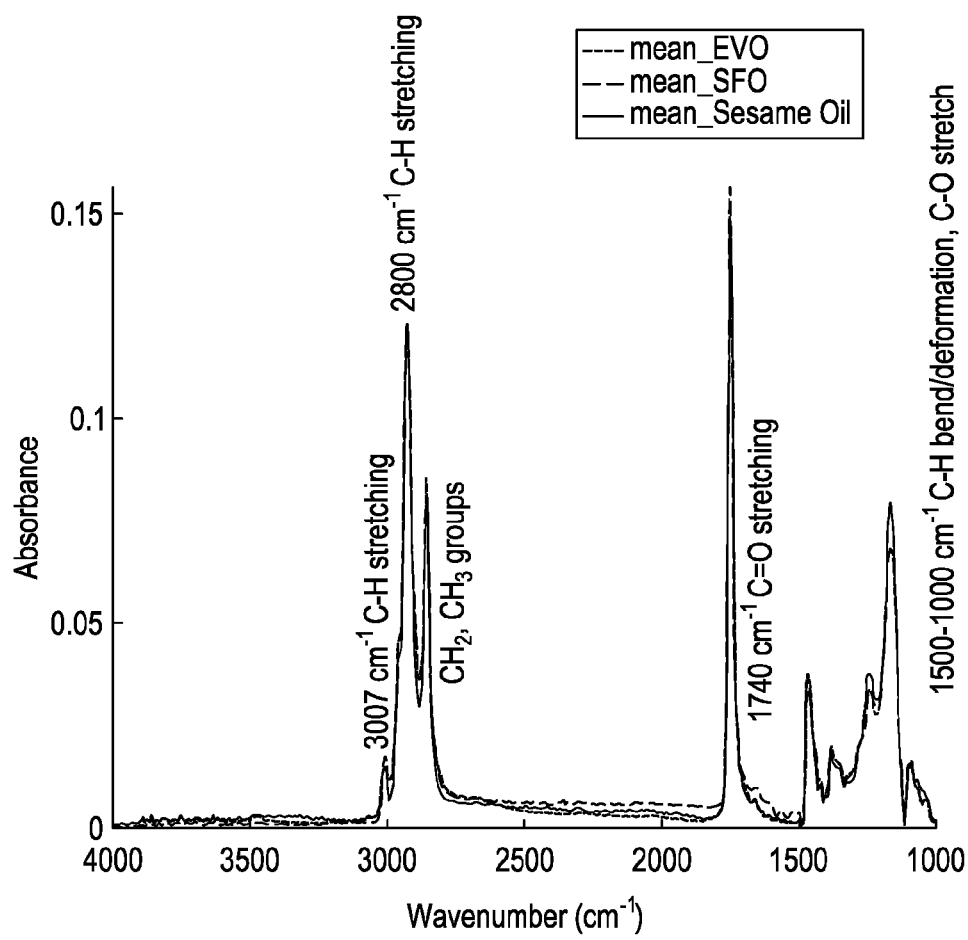
FIG. 12: Shows spectra obtained from an oil sample.

As shown in FIG. 12 (Mean unprocessed FTIR spectra of extra virgin olive oil (EVO), sunflower oil (SFO) and sesame oil obtained using the present invention), food oil has a strong spectral fingerprint, however chemically these oils differ in their relative mono- and poly-saturated fat content, however the raw spectra look very similar, with only very subtle peak shifts.

Figure 13:
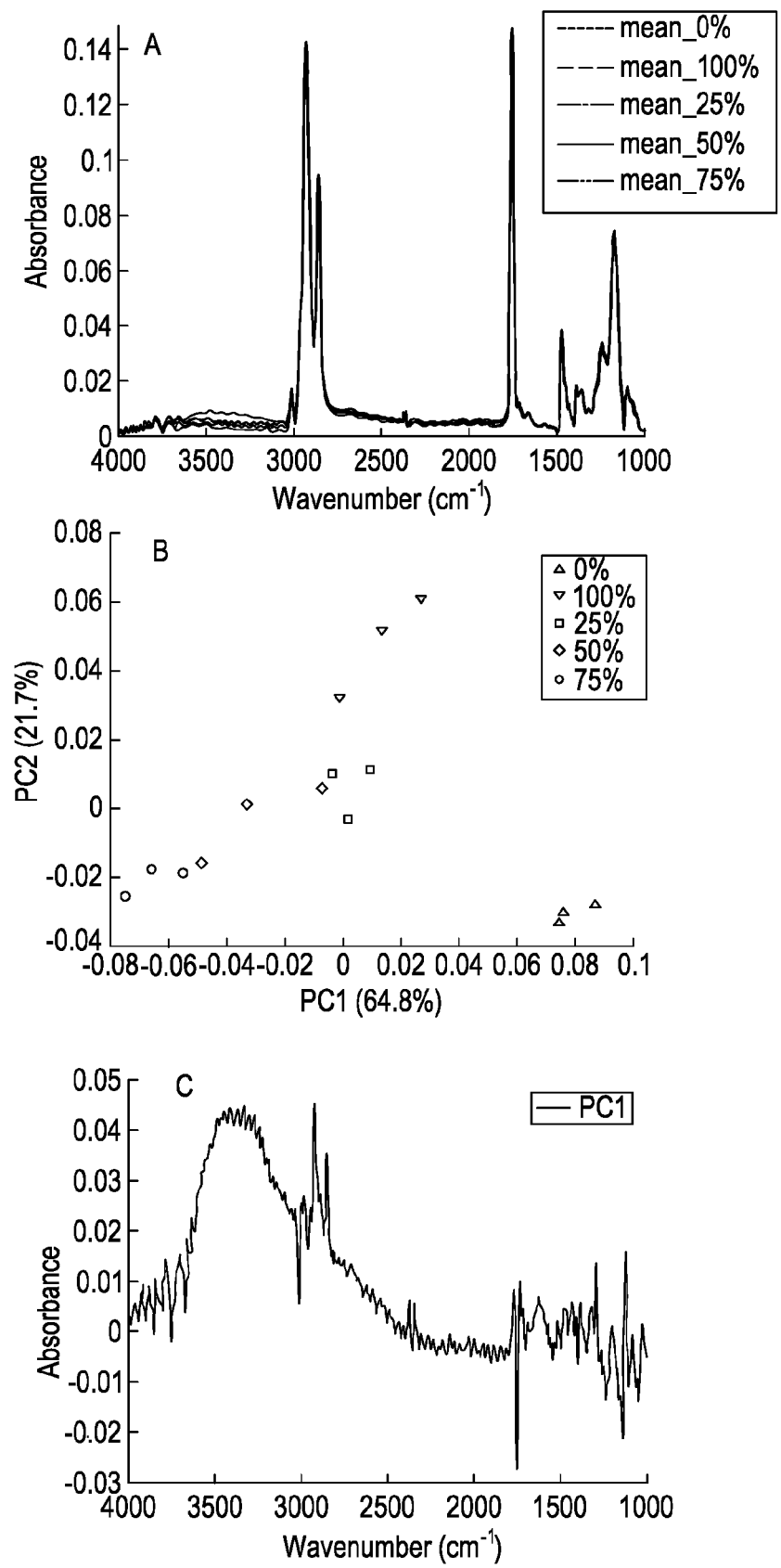
FIG. 13: Shows raw data and analysis of data from an oil sample.

Theoretically, the dilution of extra virgin olive oil with a cheaper oil, such as sunflower oil, would prove more challenging than a whisky dilution study. As such, FIG. 13A shows unprocessed spectra obtained from a sample located on an IRE as part of the present invention, where the samples are of olive oil at varying levels of dilution with sunflower oil (0, 25, 50, 75, 100%), with FIG. 13B showing the subsequent principal component analysis scatter plot, and FIG. 13C showing the corresponding principal component 1 loading plot.

Figure 11:
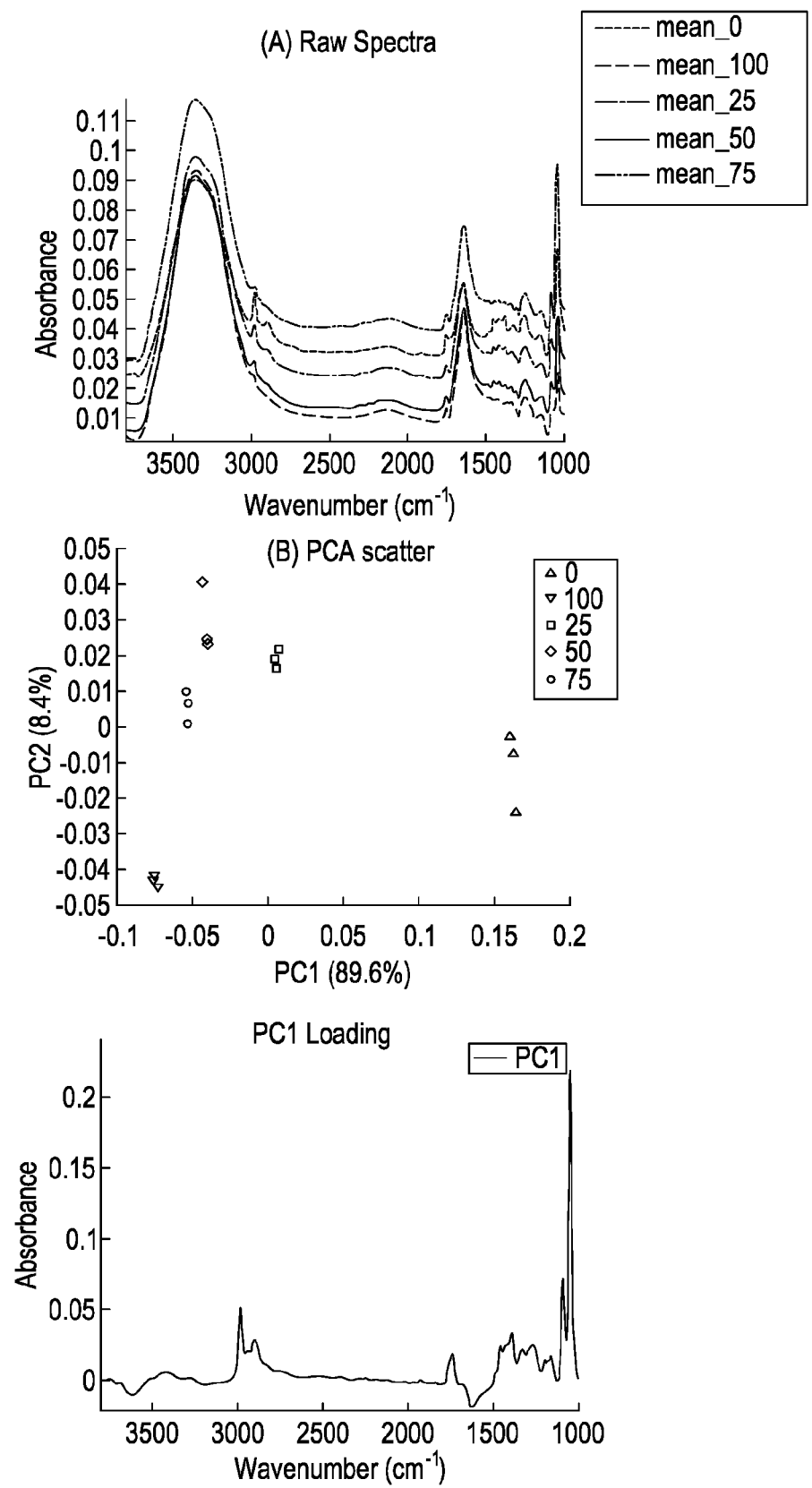
FIG. 11: Shows raw data and analysis of data from a whisky sample.

Similar to FIG. 11, spectra look very similar with little visible differences between spectra identifiable. However, using PCA, the effects of mixing the oils become apparent. Undiluted olive oil appears on the positive of PC1, then subsequently drifts more to the negative of PC1 when sunflower oil is added (FIG. 13B). When the loading for this PC is analysed, this can largely be associated with changes to the pea at 1740 cm-1 corresponding to the C=O stretching of triglycerides. This peak may be discriminatory between the two oils, with slight shifts indicating different oil types.

Example 4: Powders

As previously stated, the present invention may also be used to obtain ATR-FTIR spectra from powders. This container containing IRE of the present invention enables samples to be contained securely, whilst also providing additional pressure on the sample itself; ensuring a close contact between sample and the sample-receiving surface of the IRE. This contact is essential for solid sample analysis as it allows interaction of the evanescent wave with the sample across the whole optically active surface area of the second face of the IRE.

Figure 14A:
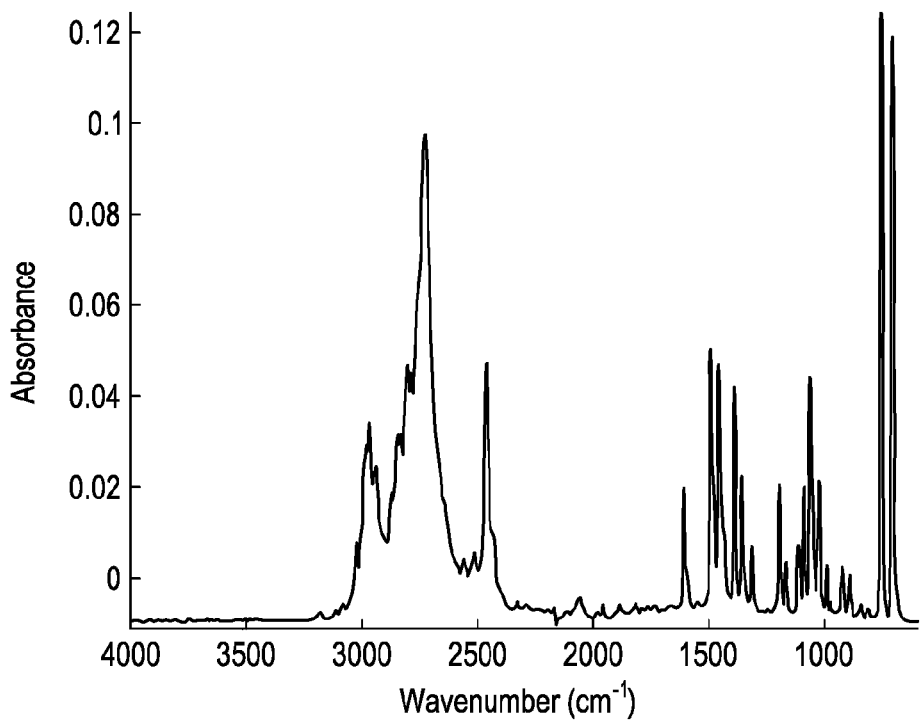
FIGS. 14A, 14B, 14C and 14D show a spectra obtained from drug samples being tested.
Figure 14B:
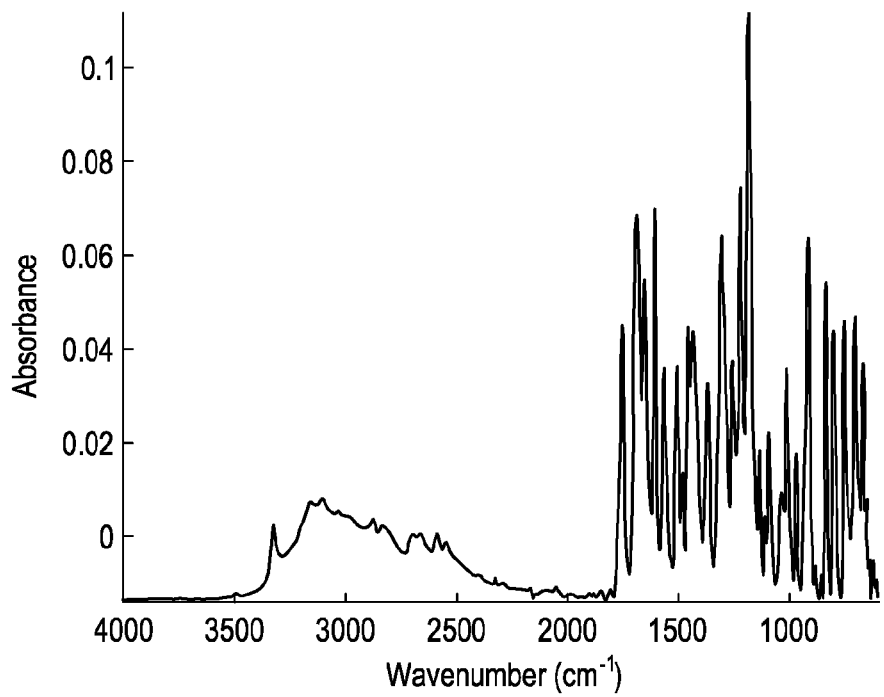
Figure 14C:
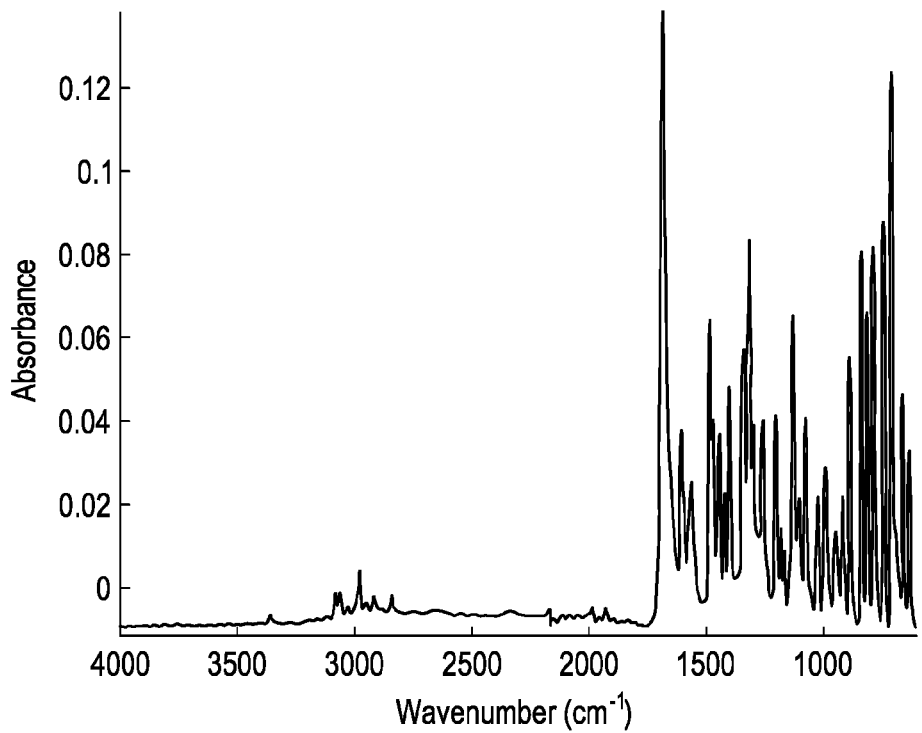
Figure 14D:
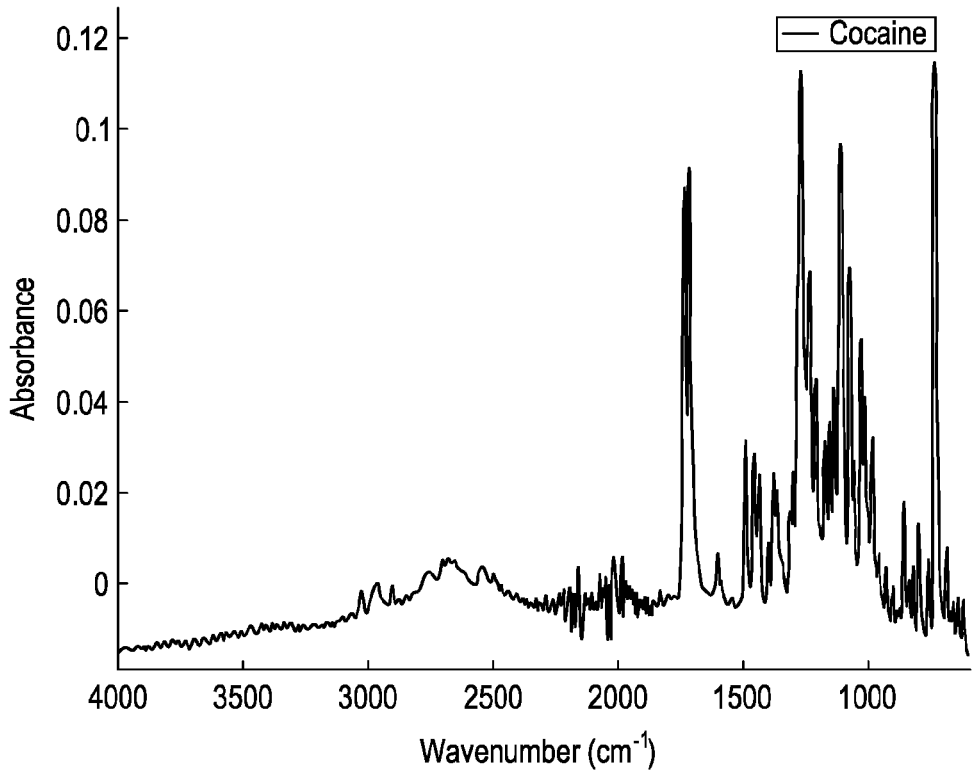

Powder analysis opens up further applications for the technology, particularly in the field of pharmaceuticals and forensics. As shown in FIGS. 14 A-D, the present invention was used to obtain spectra from a variety of drugs: the characteristic IR fingerprints of three controlled substances as well as a commercially available pain relief tablet. FIG. 14A: amphetamine, B: Anadin pain relief, C: diazepam and D: cocaine. Simple analysis would be able to differentiate these powders form each other, and could also be used in adulteration and quality control studies.

It can be appreciated that the sample receiving elements, containers and methods as discussed herein can be used to analyse a wide variety of samples both biological and non-biological in which ATR-FTIR spectrometry can be undertaken.

To allow a simpler method to be employed to analyse samples provided on an IRE as discussed herein, the inventors have provided a new method of locating an IRE of the present invention in a spectrophotometer. As part of this method, the inventors have devised a locating shoe which can be provided to a spectrophotometer, for example as an ATR accessory which ensures easy, positive location of the IRE, in the correct orientation.

Example 5 Serum Analysis

Figure 15A:
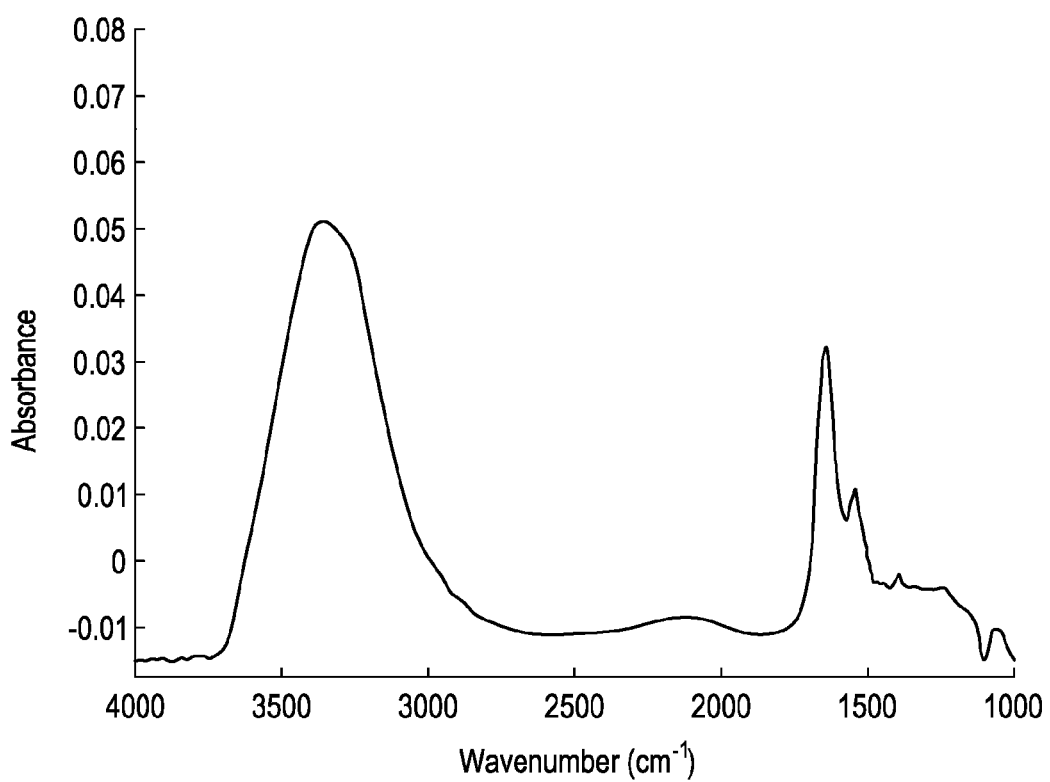
FIG. 15: Shows an ATR-FTIR spectrum of human blood serum in a wet format (15A) and ATR-FTIR spectrum of human blood serum after drying at room temperature (15B).
Figure 15B:
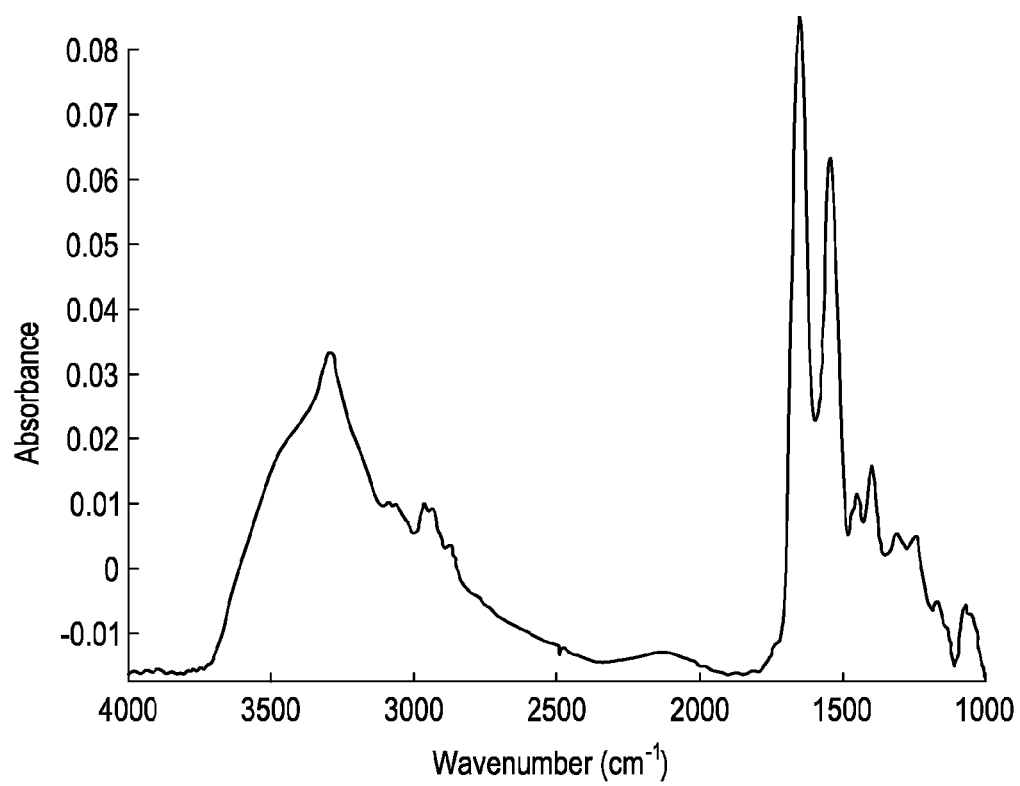

FIGS. 15 A and B show use of the present invention for analysis of liquid analysis of clinical specimens, such as blood components like serum. This can be used for diagnostic, qualitative or quantitative measurements.

Blood serum was measured in liquid form (FIG. 15A). The water component of serum can be seen in the resultant spectrum, as well as underlying biological signals from the serum, in particular protein contributions.

Figure 7A:
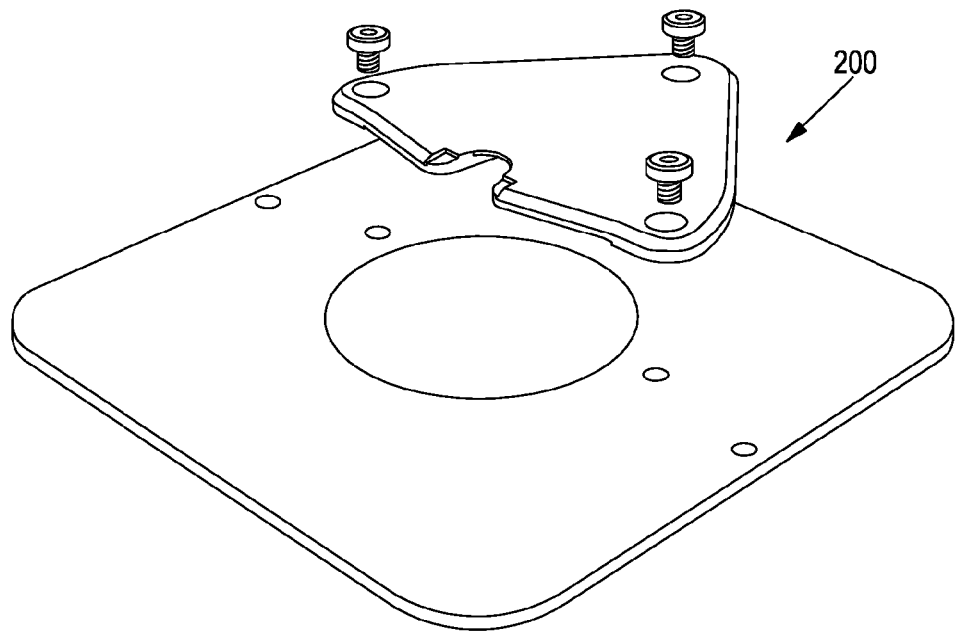
FIGS. 7A and 7B show an adaptor to hold a cap, sample receiving portion or sample container of the present invention relative to the aperture of a spectrophotomer, wherein the adaptor may be mounted on a spectrometer, and wherein the adaptor is shaped to locate and position the cap, sample receiving portion or sample container relative to the spectrophotometer to permit spectroscopy of a sample.
Figure 7B:
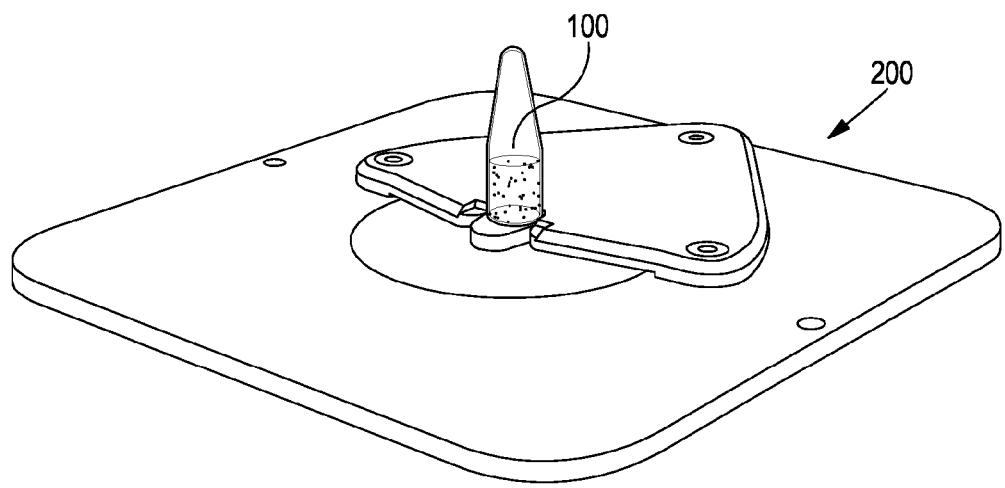

FIGS. 7A and 7B indicate an embodiment of an adaptor 200 (shoe) for an ATR-FTIR spectrometer to permit the coupling of the sample-receiving element or sample container 100 of the present invention to an ATR-FTIR spectrometer. FIG. 7B also indicates how the embodiment of the present invention shown in FIG. 4 may be inverted to provide the sample 20 in the container 100 to the sample-receiving portion. In this configuration, the sample may be investigated by FTIR spectroscopy.

Figure 16:
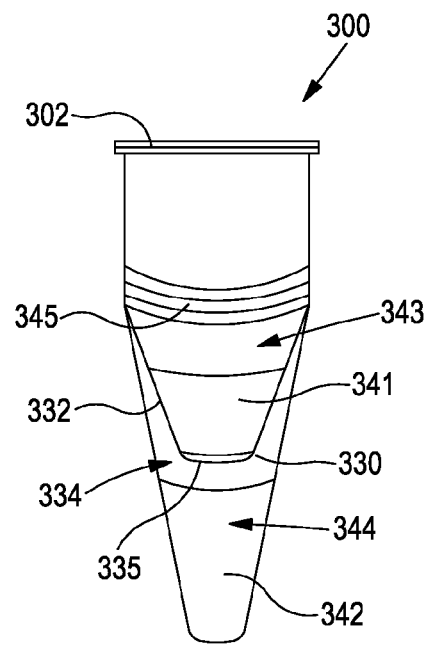
FIG. 16: Shows a container according to another embodiment of the present invention, having an upper and a lower section, and a permeable membrane therebetween.

FIG. 16 shows a container 300 according to another embodiment of the present invention. The sample container 300 is generally similar to the sample container 100 of FIG. 1, like parts denoted by like numerals, but incremented by '200'.

The container 300 of FIG. 16 additionally comprises a divider 330. The container 300 has a lower compartment 342 located at an end opposite the cap 302. The sample container 300 has an upper compartment 341 near an end containing the cap 302. The lower compartment 342 and the upper compartment 341 are separated by a divider 330 which extends substantially across a width of the container 300.

In this embodiment, the divider 330 has an impermeable portion 332 which is typically made of plastic, glass or the like, and a membrane region 334 having a membrane 335 located near a central region of the divider 330.

Conveniently, the divider 330 defines a cup portion which is capable of receiving and/or holding a substance therein. The membrane 335 may be a flexible membrane or may be a rigid or solid membrane. In this embodiment, the membrane was a solid membrane made of Polyvinylidenfluoride (PVDF) with pores size of 0.45 µm (white colour), wetted by a Support Liquid Membrane (SLM) consisting of 5 µL of 1% Trioctylamine (TOA) in Dodecyl Acetate. The solid membrane was obtained from Sterlitech Corporation (Polyvinylidene Fluoride (PVDF) Membrane Filters 0.45 Micron, 13 mm, 100/Pk P/N: 1370014 Lot: H1F4601BR).

It will be appreciated that the specific type of membrane 335 selected for use in the divider 330 may be chosen to allow an analyte or a plurality of analytes of interest to migrate or permeate through the membrane 335, in use, whilst preventing or limiting permeation or migration of other substances through the membrane 335.

The container 300 comprises an upper section 343 which contains the cap 302, and a lower section 344 which defines the lower compartment 342, in use. In this embodiment, the upper section 343 and the lower section 344 are connected by a screw fit connection 345 which provides a sealed connection between upper section 343 and the lower section 344.

Figure 17:
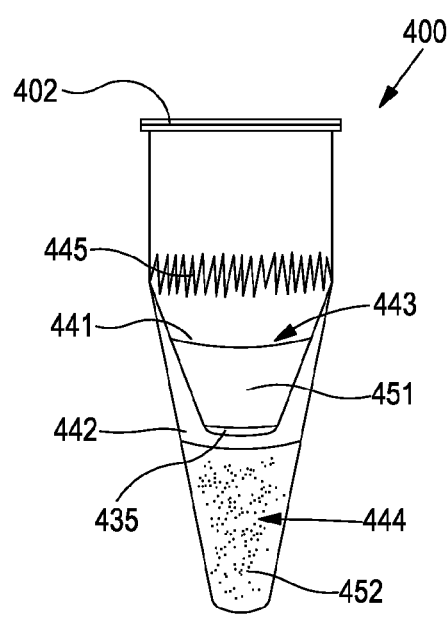
FIG. 17: Shows another embodiment of the sample container of FIG. 16.

FIG. 17 shows a container 400 according to another embodiment of the present invention. The sample container 400 is generally similar to the sample container 300 of FIG. 17, like parts denoted by like numerals, but incremented by '100'. However, in the embodiment of FIG. 17, the container 400 has an upper section 443 and a lower section 444 which have been welded together by heating (melting the plastic of the upper and lower sections) in order to provide a sealed connecting 445 between upper compartment 441 and lower compartment 442. The lower compartment 442 contains a sample 451, and the upper compartment 441 contains an acceptor medium 451 configured to accept, absorb, or dilute a/the target analyte or substance present in the sample 451 once it has permeated or migrated through the membrane 435.

In use, a typical Standard Operation Procedure (SOP) may be as follows:

1) Remove the bottom part of an Eppendorf vial and the top part of another one;
2) Attach PVDF membrane 335,435 to the top portion 343,443 of the vial;
3) Load the lower section 344,444 of the vial with a sample 452;
4) Wet the PVDF membrane 335,435 with 5 µL of Support Liquid Membrane (SLM) solution;
5) Connect upper section 343,443 and lower section 344,444, and secure them together (via screw fit 345 in FIG. 15, welded connection 445 in FIG. 16, or any other suitable connection means);
6) Load the upper section 343,443 of the container with an acceptor solution 451;
7) Vortex the vial, for example for 2 hours at 900 rpm;
8) Analyse with an ATR-FTIR spectrometer the resultant solution in the upper portion 343,443 of the container of the vial.

Materials
Acceptor solution: (pH 3.0): 100 µL of Formic Acid (HCOOH; 20 mM, prepared in MilliQ water)
Solid Membrane: Polyvinylidenfluoride (PVDF; pores size=0.45 µm; white colour); with Support Liquid Membrane (SLM): 5 µL of 1% Trioctylamine (TOA) in Dodecyl Acetate
Sample (215 µL; pH 9.0): 100 µL of Venlafaxine Hydrochloride (2 mg in 1 mL of Methanol, MeOH; fully dissolved) and 115 µL of Sodium Hydroxide (NaOH; 40 mM, prepared in MilliQ water).

Investigation of Selective Membrane Embodiments

ATR-FTIR analysis was carried out using the containers of FIGS. 16 and 17 having a selective membrane 335,445.

Figure 18:
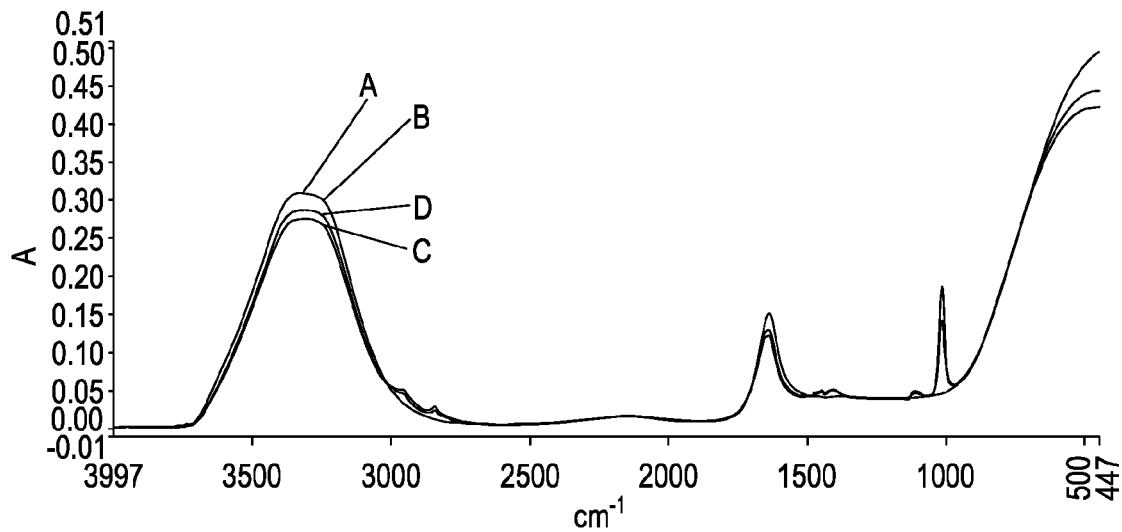
FIG. 18: Shows controls spectra.

FIG. 18 shows controls spectra. Curve A (Red, covered by curve B) is the spectrum obtained from liquid NaOH 40 mM. Curve B (Dark green, covers curve A) is the spectrum obtained from liquid HCOOH 20 mM. Curve C (orange) is the spectrum obtained from 100 µL Venlafaxine*HCl in 115 µL NaOH 40 mM. Curve D (bright green) is the spectrum obtained from 100 µL Venlafaxine*HCL in 100 µL HCOOH 20 mM.

Figure 19:
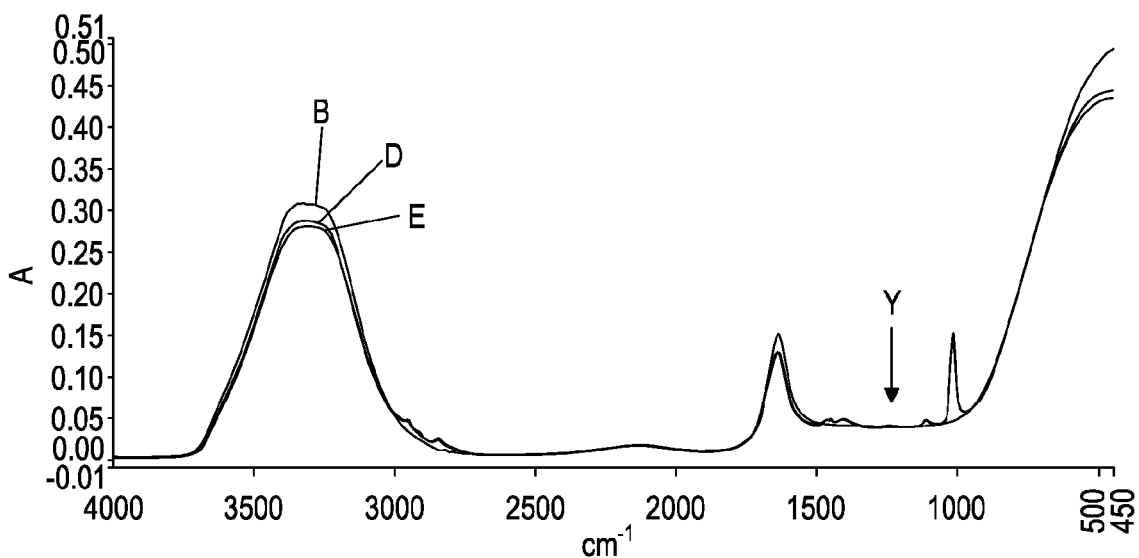
FIG. 19: Shows spectra of the resultant solution and of controls.

FIG. 19 shows the resultant solution and controls spectra. Curve B (Dark green) is the spectrum obtained from Liquid HCOOH 20 mM. Curve D (bright green) is the spectrum obtained from 100 µL Venlafaxine*HCL in 100 µL HCOOH 20 mM. Curve E (pink) is the spectrum obtained from the resultant solution 451 after permeation through membrane 345,445.

It can be observed that the spectrum for the resultant solution (E, pink) matches the control solution spectrum (D, bright green). The spectrum of the control solution (B, dark green) is also displayed showing that several key peaks are missing.

These spectra show evidence that the resultant solution contained the drug used in these experiments. Moreover, the small peak indicated with the blue arrow Y in FIG. 19 is present only in the resultant solution.

Figure 20:
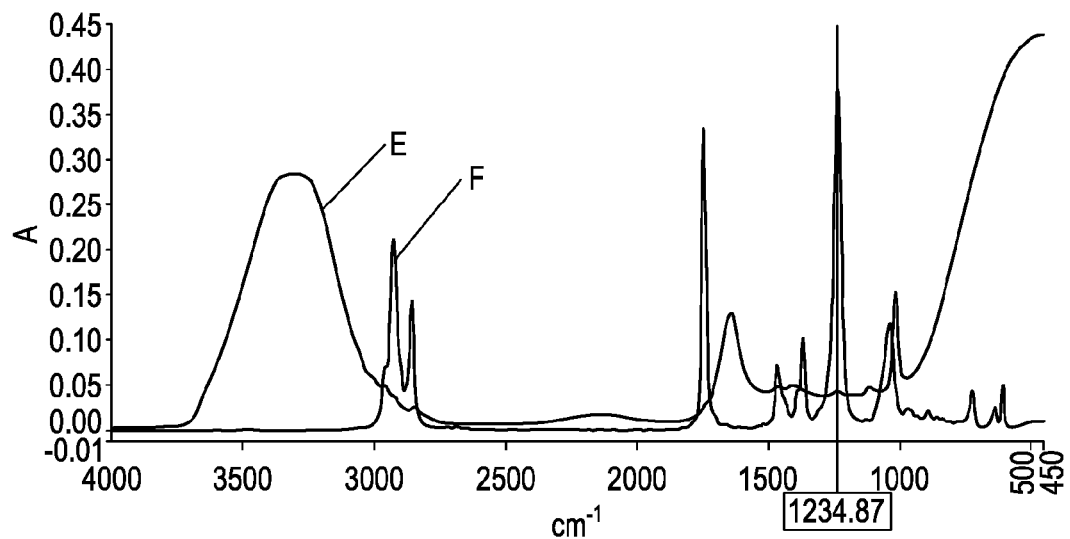
FIG. 20: Shows spectra of the resultant solution and of SLM.

Further analysis (see FIG. 20) showed that the peak at 1234.87 cm$^{-1}$ (indicated by arrow Y in FIG. 19) is characteristic of the SLM (1% TOA in Dodecyl Acetate). FIG. 20 shows spectra of the resultant solution liquid (E, pink), and of SLM (F, black).

Figure 21:
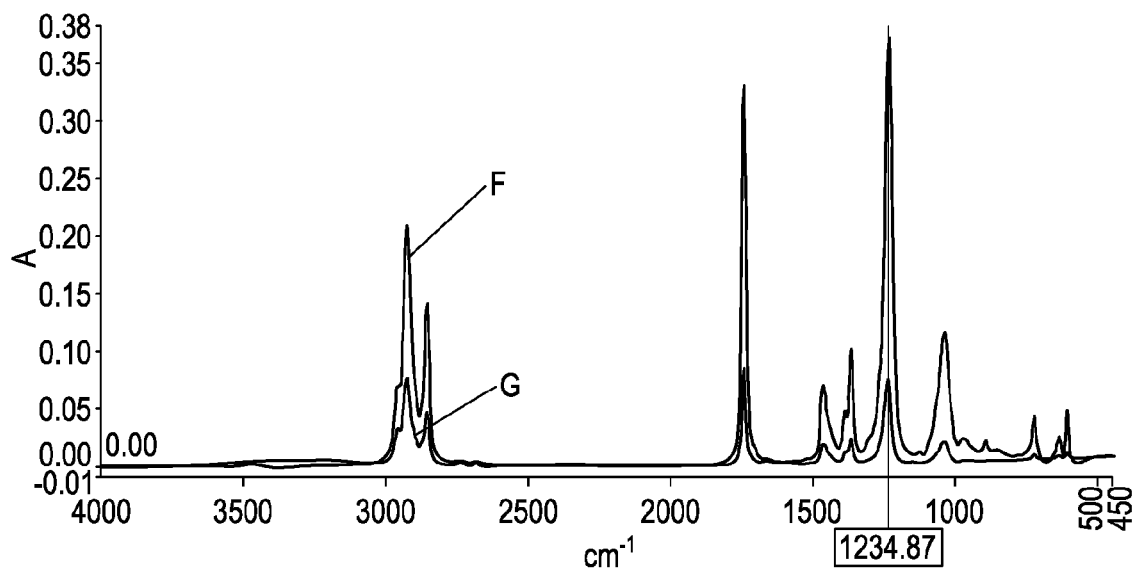
FIG. 21: Shows spectra similar to those of FIG. 20, after 3 minutes of drying the resultant solution.

FIG. 21 shows spectra similar to those of FIG. 20, after drying the resultant solution.

Drying was carried out under the following conditions: 2 µL of solution were left onto the internal reflection element to dry at ambient conditions. Data registered during the experiments are a variable range of temperature and humidity, 21-22° C. and 40-50% respectively.

FIG. 21 shows spectra of the resultant solution (G, pink) after 3 minutes of drying, and of SLM (F, black). As can be seen, when drying, evidence of the SLM are shown to be present in the resultant solution (FIG. 21).

Figure 22:
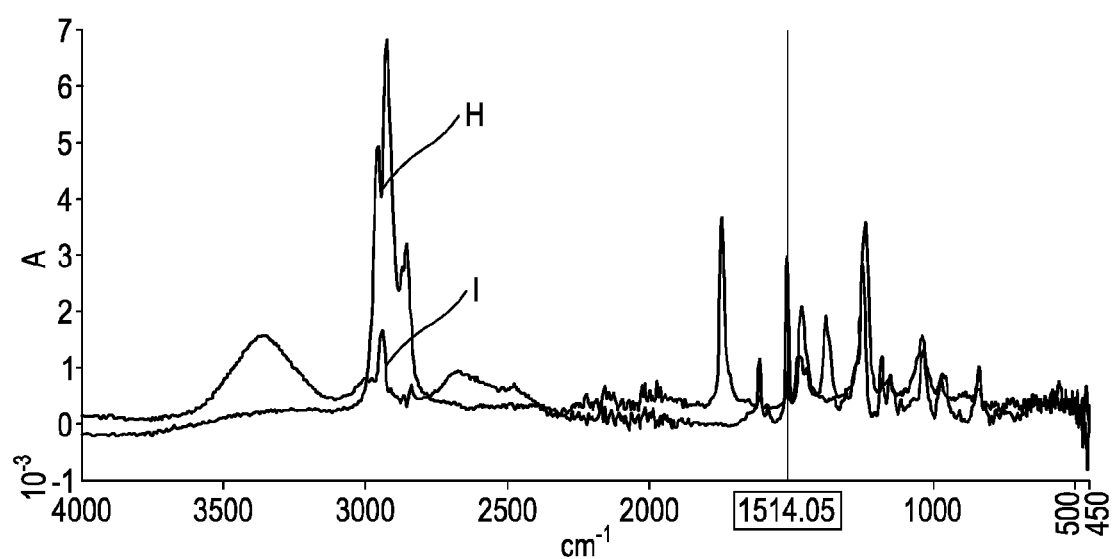
FIG. 22: Shows spectra of the resultant solution after 17 minutes of drying, and of 2 mg Venlafaxine*HCl in 1 mL MeOH.

FIG. 22 shows spectra of the resultant solution (H, pink) after 17 minutes of drying, and of 2 mg Venlafaxine*HCl in 1 mL MeOH (I, violet). It can be seen that one characteristic peak of Venlafaxine Hydrochloride in MeOH is visible in the resultant solution (1514.05 $cm^{-1}$).

In order to confirm that only the drug filtrated through the PVDF membrane, a test was performed by filling the upper section 343,443 and lower section 344,444 of two different vials with NaOH and HCOOH solutions and putting them in agitation for more than an hour. No leakage was detected.

From the results discussed in connection with FIGS. 18-22, it can be concluded that the design of containers 300,400 allows successful selective transfer of drugs, with the opportunity for expansion to a wide range of molecules, through the methodology explained above. Moreover, the membrane loaded with the organic phase (SLM) can successfully create different compartment for aqueous solutions.

The invention claimed is:

1. A sample container, comprising:
   a) an internal cavity defined by an internal wall and a lid; and
   b) an internal reflective element (IRE) integrated into the lid, wherein the IRE comprises:
      i) a first surface comprising at least a portion of the internal wall and in communication with the internal cavity; and
      ii) a second surface comprising a plurality of grooves or prisms that are either aligned, parallel, adjacent and/or a combination thereof, wherein each groove or prism defines a first face and a second face, wherein the first face and the second face of each groove and/or prism extends at an angle relative to the second surface of about 30-75°;
   wherein the second surface is external to the container and opposite to the first surface.

2. The sample container of claim 1, wherein the IRE integrates into the lid by a friction fit or a screw thread.

3. The sample container of claim 1, wherein the lid is connected to the sample container by a hinged portion.

4. The sample container of claim 1, wherein the is a cap or a plug.

5. A device, comprising:
   a) a sample container comprising a cap that is suitable for analysis of a clinical specimen in a spectrometer, wherein the sample container is a vial, a tube container or a capsule container;
   b) an internal reflective element (IRE) that forms at least a portion of a wall of the cap and comprises a first surface configured to receive a sample and a second surface that is a beam-receiving surface opposite the first surface, and;
   c) a plurality of grooves or prisms that are either aligned, parallel, adjacent and/or a combination thereof on the second surface, wherein each groove or prism defines a first face and a second face, wherein the first face and the second face of each groove and/or prism extends a n angle relative to the second surface of about 30-75°.

6. The sample container as claimed in claim 5, wherein the sample container further comprises a membrane or a filter that can selectively provide components of a sample to the IRE of the sample container.

7. The sample container as claimed in claim 5, wherein the first surface is provided in a cap wherein, in use, closure of the cap on the container places the sample in direct contact with the IRE.

8. The sample container of claim 1 or claim 5,
   wherein the sample container comprises a second or further IRE, wherein the second or further IRE comprises a first surface and a second surface;
   wherein the first surface of the second IRE is configured to receive a sample and wherein the second surface of the second IRE is a beam-receiving surface, and
   wherein, in use, the first surface of the second IRE is provided on an internal wall of the sample container, such that when a sample is provided on the first surface of the second IRE, the sample is locatable within the sample container.

9. The sample container of claim 1 or claim 5, wherein the second surface of at least one of the IRE is provided with a protective cover.

10. The sample container of claim 1 or claim 5 wherein at least one of the IRE is made out of silicon.

11. A method of spectroscopic analysis providing the sample container of claim 1, or claim 5, the sample container further comprising a sample and a spectrometer; and analyzing the sample with the spectrophotometer.

12. The sample container of claim 1, or claim 5, further comprising an adaptor coupled to an Attenuated Total Reflection Fourier-Transform Infrared (ATR-FTIR) spectrometer which holds the sample container in a fixed position relative to the ATR-FTIR spectrometer.

13. The sample container of claim 12, wherein the adaptor further comprises a holding means selected from the group consisting of a clamp and a receiving portion.

14. A combination of a first portion of a sample container and a second portion of the sample container, wherein the sample container is a vial, a tube container or a capsule container, and the sample container is suitable for analysis of a clinical specimen,
   wherein the first portion of the sample container comprises a sample-receiving element and is configured to interact with the second portion of the sample container to provide at least a portion of a wall of the sample container, the sample receiving element comprising an internal reflective element (IRE),
   wherein the IRE comprises a first surface, and a second surface comprising a plurality of grooves or prisms that are either aligned, parallel, adjacent and/or a combination thereof, wherein each groove or prism defines a first face and a second face, wherein the first face and the second face of each groove and/or prism extends at an angle relative to the second surface of about 30-75°;
   wherein the first surface is configured to receive a sample and wherein the second surface is a beam-receiving surface opposite the first surface, and
   wherein, in use, the first surface of the IRE is provided on an internal wall of a cap of the sample container, such that when the sample is provided on the first surface of the IRE, the sample is locatable within the sample container.

15. A cap, comprising:

an aperture extending from a first surface to a second, opposite, surface of the cap;

a recess in the first surface placed over the aperture; and an internal reflection element (IRE) integrated into the recess, the IRE comprising a plurality of grooves or prisms that are either aligned, parallel, adjacent and/or a combination thereof on an external surface, wherein each groove or prism defines a first face and a second face, wherein the first face and the second face of each groove and/or prism extends at an angle relative to the external surface of about 30-75°.

16. A kit comprising the sample container of claim 5 and an adaptor configured to hold the sample container in a fixed position.

17. The sample container as claimed in claim 7, wherein closure of the lid provides compression of the sample onto the IRE.

18. The sample container as claimed in claim 9, wherein the protective cover comprises a removable adhesive film.

19. A system, comprising:
a) a sample container comprising:
  i) an internal cavity defined by an internal wall and a lid;
  ii) at least one internal reflective element (IRE) integrated into the lid, wherein the IRE comprises:
    A) a first surface comprising at least a portion of the internal wall and in communication with the internal cavity;
    B) a second surface comprising a beam-receiving surface that is external to the sample container and is opposite the first surface; and
    C) a plurality of grooves or prisms that are either aligned, parallel, adjacent and/or a combination thereof on the second surface, wherein each groove or prism defines a first face and a second face, wherein the first face and the second face of each groove and/or prism extends at an angle relative to the second surface of about 30-75°; and;
b) a spectrometer comprising an adaptor, said adaptor configured to couple the sample container to the spectrometer.

* * * * *